(12) United States Patent
Wilkins et al.

(10) Patent No.: US 8,364,711 B2
(45) Date of Patent: Jan. 29, 2013

(54) CONTACT MANAGEMENT SYSTEM AND METHOD

(76) Inventors: John Wilkins, Danville, CA (US); Michael Keefe, Danville, CA (US); Sam Rehman, San Francisco, CA (US)

(*) Notice: Subject to any disclaimer, the term of this patent is extended or adjusted under 35 U.S.C. 154(b) by 1111 days.

(21) Appl. No.: 12/116,862

(22) Filed: May 7, 2008

(65) Prior Publication Data

US 2008/0205655 A1 Aug. 28, 2008

Related U.S. Application Data

(63) Continuation-in-part of application No. 11/713,475, filed on Mar. 2, 2007, which is a continuation-in-part of application No. 11/431,886, filed on May 9, 2006, now Pat. No. 8,255,464.

(51) Int. Cl.
*G06F 17/30* (2006.01)

(52) U.S. Cl. .................................................. 707/783

(58) Field of Classification Search .................. None
See application file for complete search history.

(56) References Cited

U.S. PATENT DOCUMENTS

| | | | |
|---|---|---|---|
| 5,594,791 A * | 1/1997 | Szlam et al. | 379/265.09 |
| 5,659,596 A | 8/1997 | Dunn | |
| 5,952,942 A * | 9/1999 | Balakrishnan et al. | 341/20 |
| 5,987,440 A * | 11/1999 | O'Neil et al. | 705/44 |
| 6,094,573 A | 7/2000 | Heinonen et al. | |
| 6,189,096 B1 * | 2/2001 | Haverty | 713/155 |
| 6,393,421 B1 | 5/2002 | Paglin | |
| 6,694,353 B2 | 2/2004 | Sommerer | |
| 6,701,348 B2 | 3/2004 | Sommerer | |
| 6,820,204 B1 * | 11/2004 | Desai et al. | 726/6 |
| 7,110,773 B1 | 9/2006 | Wallace et al. | |
| 7,590,705 B2 * | 9/2009 | Mathew et al. | 709/217 |
| 7,668,831 B2 * | 2/2010 | DeRobertis et al. | 707/783 |
| 7,711,748 B2 * | 5/2010 | Bright et al. | 707/783 |
| 2002/0040318 A1 * | 4/2002 | Amano et al. | 705/14 |
| 2002/0129260 A1 * | 9/2002 | Benfield et al. | 713/189 |
| 2003/0041065 A1 * | 2/2003 | Lucovsky et al. | 707/10 |
| 2004/0024846 A1 | 2/2004 | Randall et al. | |
| 2005/0004874 A1 * | 1/2005 | Gilmour et al. | 705/51 |
| 2005/0005168 A1 * | 1/2005 | Dick | 713/201 |
| 2005/0065950 A1 * | 3/2005 | Chaganti et al. | 707/100 |
| 2005/0124320 A1 | 6/2005 | Ernst et al. | |
| 2005/0192000 A1 | 9/2005 | Lloyd | |
| 2006/0036748 A1 * | 2/2006 | Nusbaum et al. | 709/228 |
| 2006/0047725 A1 * | 3/2006 | Bramson | 707/204 |
| 2006/0258397 A1 * | 11/2006 | Kaplan et al. | 455/556.1 |
| 2007/0147274 A1 * | 6/2007 | Vasa et al. | 370/310 |
| 2007/0150444 A1 * | 6/2007 | Chesnais et al. | 707/3 |

OTHER PUBLICATIONS

"Access Control Meets Public Key Infrastructure, or: Assigning Roles to Strangers," by Herzberg et al. In: Security and Privacy (2000). Available at: IEEE Xplore.*

"A Trust based Access Control Framework for P2P File-Sharing Systems," by Tran et al. In: Proc. of the 38th Hawaii Int'l Conf. on System Sciences (2005). Available at: IEEE Xplore.*

Serial No. TDB0901.0055, "e-business Card System", Software Patent Institute Database of Software Technologies, Software Patent Institute, 2003, 2 pages.

(Continued)

*Primary Examiner* — Neveen Abel Jalil
*Assistant Examiner* — Daniel Kinsaul

(57) ABSTRACT

In an embodiment of a method of providing contact information, the method includes creating a contact record in a contact management system, where a process associated with a subject of the contact record and/or a recipient of data associated with the contact record is included in creating the contact record. A unique serial number is generated corresponding to the contact record and the serial number is conveyed to the recipient. A request by an application is received for the contact record from the contact management system corresponding to the serial number and data associated with the contact record is transmitted to the application.

45 Claims, 24 Drawing Sheets

OTHER PUBLICATIONS

Serial No. TDB1093.0202, "Coded Business Cards", Software Patent Institute Database of Software Technologies, Software Patent Institute, 2003, 2 pages.
http://www.vcardlink.com.
http://www.rolobiz.com.
Notification of Transmittal of the International Search Report and the Written Opinion of the International Search Authority, or the Declaration dated Jul. 7, 2008.
Written Opinion of the International Searching Authority dated Jul. 7, 2008.

* cited by examiner

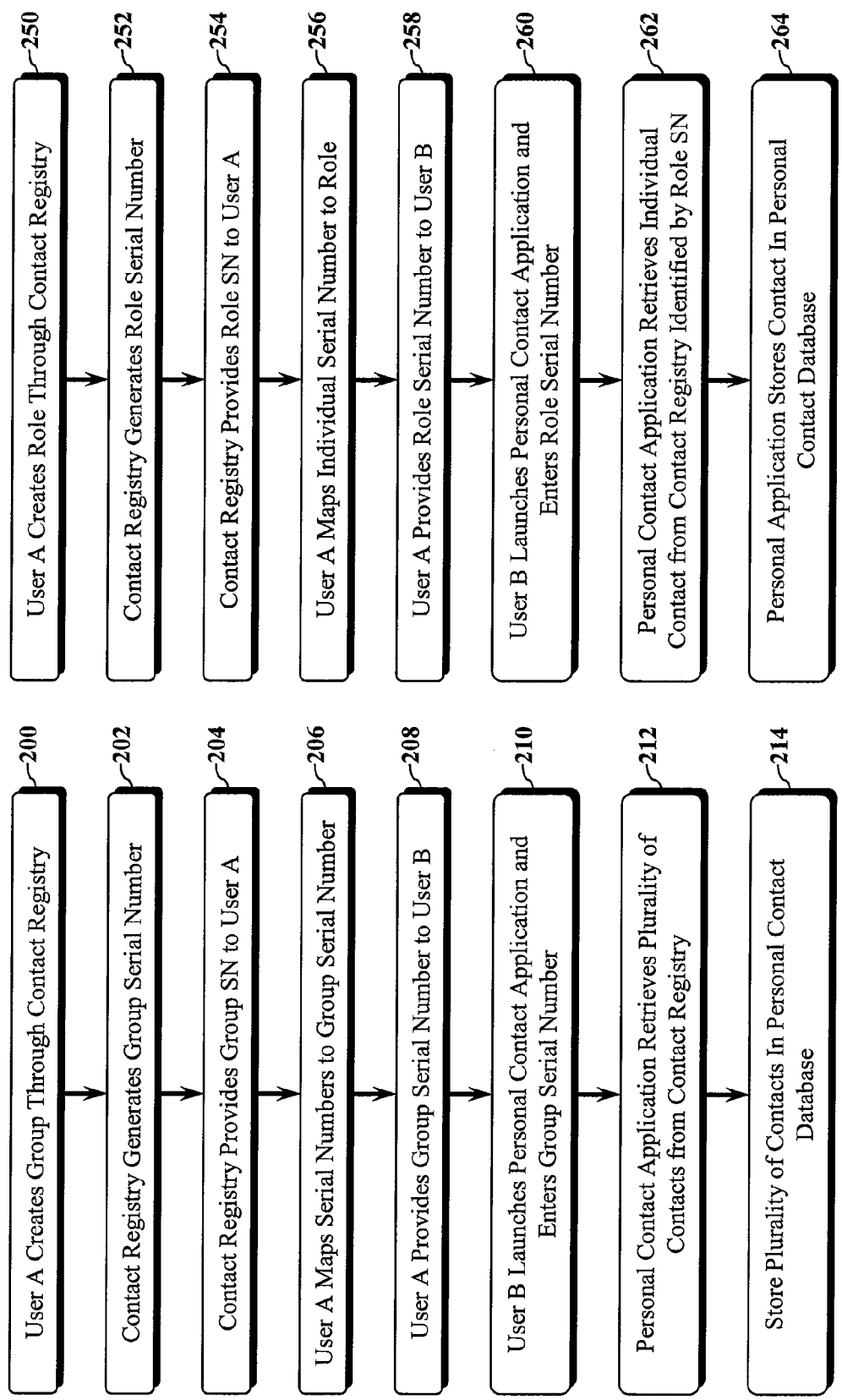

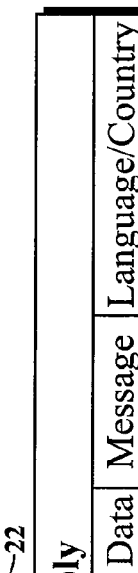

Fig. 6a — Search Request: User ID | Search Criteria

Fig. 6b — Search Result: First and Last Name | SN | Public Profile

Fig. 6c — Search Result Container: Search Result | Search Result

Fig. 7a — Contact Request: User ID | Device ID | Reply Format | Request Type | SN | SN PIN | Language/Country | Category Fig. 7b — Contact Reply: Reply Type | SN | Contact Record Data | Message | Language/Country Fig. 7c — Contact Reply Container: Contact Reply | Contact Reply

Fig. 15b

670:
```
<html>
<body>
<input type="text" id="company" />
<input type="text" id="fname" />
<input type="text" id="lname" />
</body>
</html>
```

672:
```
<?xml version="1.0"?>
<dataMap>
<contactInfo>
<companyName src="syncConame" targetId="company" />
<firstName src="syncFirstName" targetId="fname" />
<lastName src="syncLastName" targetId="lname" />
</contactInfo>
</dataMap>
```

674:
```
<?xml version="1.0"?>
<contactInfo>
<serial id="serialNum">JDOE2345Z</serial>
<companyName id="syncConame">Acme</companyName>
<firstName id="syncFirstName">Jack</firstName>
<lastName id="syncLastName">Frost</lastName>
</contactInfo>
```

676:
```
<script>
  var coName = doc.getElementById('company');
  coName.value = doc.getElementById('syncConame').value;
</script>
```

CONTACT MANAGEMENT SYSTEM AND METHOD

CROSS-REFERENCE TO RELATED APPLICATIONS

This application is a continuation-in-part of U.S. patent application Ser. No. 11/713,475, filed Mar. 2, 2007, which is a continuation-in-part of U.S. patent application Ser. No. 11/431,886, filed May 9, 2006, both of which are incorporated by reference herein.

FIELD OF THE INVENTION

The present invention relates generally to contact management systems and, more particularly, to systems and methods for selectively disseminating personal contact information.

BACKGROUND OF THE INVENTION

It is customary for individuals involved in personal, commercial or professional activities to exchange contact information with their associates. In a typical exchange, parties convey company names, personal names, job titles, telephone numbers, mailing addresses, email addresses, web page addresses and other contact information. The mode of exchange usually includes stating the information verbally, writing down the information or exchanging business cards or stationery. Traditionally, people have recorded and organized contact information manually by writing contact information into an address book or by affixing a business card or a contact entry to a record keeping system such as Rolodex®.

Today's computer-based contact management applications provide powerful search and retrieval capabilities and user friendly application interfaces, which make it convenient for individuals to enter contact information into their personal computers. Contact management applications are also found on portable devices including cellular telephones, hand-held computers, VoIP (Voice over Internet Protocol) telephones, and web-based applications. Additionally, many businesses employ enterprise resource planning systems, customer relationship management systems, sales force automation systems and other systems having contact management functionality. As a result, a large number of contact management applications are available for personal and business use, and individuals regularly utilize more than one contact management application to store and maintain their contact information.

Entering contact information into multiple contact management applications requires a time-consuming and redundant manual data entry process. The high costs associated with manual data entry are well-understood, and many prior art systems have been designed to address these concerns. For example, creating an electronic backup file of a contact information database enables contact data to be automatically restored to a contact management application if the application's database becomes corrupt. Backup files also enable data from one application to be imported into another application, provided the file formats are compatible or translation from one format to another is feasible.

Some prior art systems were designed to minimize the burden of manually entering contact information through use of specialized hardware and software. In one approach, a business card scanner is used to scan the characters on a printed business card, and specialized Optical Character Recognition (OCR) software attempts to identify the scanned characters and assign the identified characters to appropriate data fields in a contact management application. These systems require the purchase of expensive hardware and software, and human oversight is needed to ensure accuracy of the recognized characters and placement of the data in the appropriate contact information field (e.g., the software may mistakenly assign a fax phone number to a voice phone number field). These scanning systems are typically adapted to work with personal computers and may not be compatible with small computing devices such as personal digital assistants (PDAs), handheld computers, and cellular telephones. These scanning systems are further limited to scanning printed business cards, thus contact information received through other conveyances (e.g., verbal or handwritten) will still require manual data entry.

In another approach, a Uniform Resource Locator ("URL") for an HTML web page is encoded into barcode format onto a business card. A recipient of the business card scans the barcode into a web browser application to access a corresponding web page containing personal contact information. This type of system is described in Software Patent Institute Serial Number TDB0901.0055, entitled "E-Business Card System," and Serial Number TDB1093.0202, entitled "Coded Business Cards." Drawbacks of this approach include high equipment costs and the inability to use the system to input data into existing contact management applications.

Small, portable devices such as PDAs, handheld computers or cellular phones present additional problems for users needing to manually enter contact information. Cellular phones, for example, include numeric keypads in which a single key is used for entry of a number and multiple letters. As a result, a user may need to press the same key three or four times to select a desired letter or number. Many pen-based PDAs do not include a physical keypad, but instead provide the user with a "virtual" keyboard on the PDA display that may be tapped with a pen. Some small computing devices include a miniaturized keyboard, but data entry remains more challenging than using a full-sized keyboard on a typical desktop or laptop computer. Because of the difficulty in entering and managing data on small devices, many users manage contact information using a software application on a desktop computer. The contact information can be entered and viewed through the desktop application and then downloaded to compatible contact management applications on PDAs, handheld computers and cellular phones via a cable or wireless network transmission.

To facilitate the electronic exchange of contact information, the Internet Mail Consortium developed a specification for an electronic business card data structure called a "vCard." Users typically exchange vCards as attachments to email messages. The recipient of a vCard may import the vCard data into a contact management application that supports the vCard format. Drawbacks of the vCard include the difficulty of maintaining up-to-date contact information once conveyed, and the lack of compatibility with traditional modes of conveyance such as a standard business card, which still requires manual input of contact information.

Web-based contact management applications have also been introduced, but these systems are not widely used due to drawbacks in the various approaches. In one approach, a subscriber enters contact information online, shares the information with other online subscribers, and may download other subscribers' contact information to a proprietary application. Among the drawbacks of these systems are the use of proprietary contact management software and the requirement that both parties be subscribers to the web-based system.

Another approach offers add-on modules to contact management applications in widely-adopted email applications to assist in maintaining current contact information. Examples of this type of system are described in U.S. Pat. Nos. 6,694,353 and 6,701,348. In one approach, the contact management application notifies the user when the application sends an email message to a contact at an email address that is not valid. The stored contact information may then be updated using a secondary email address for the intended recipient. In another approach, a user of an email application transmits an email message to each member of the user's contact list requesting that each recipient verify the accuracy of the recipient's current contact information. One drawback to these approaches is that use is limited to certain software applications, such as Microsoft Outlook. Another drawback is that sending emails to recipients in a contact list may be inconvenient and annoying to the recipients, because the emails effectively serve as data entry forms. When a recipient's contact information is stored in multiple contact lists, the recipient may be inundated with email requests from the owner of each list to separately verify the recipient's stored contact information. Another drawback is that these systems require unique context-dependent identifiers for use in data lookup. Context-dependent identifiers include telephone numbers and email addresses. A user who lacks a required identifier cannot store and share contact information on these systems. Further, context-dependent identifiers are subject to change, for example, as the user moves or changes jobs.

Additional approaches involve generating a unique identifier for contact management records. One approach offers a service that creates a vCard record and attaches an identifier to the record. This approach does not appear to offer any means of augmenting an application such as an email application with data entry, update, synchronization or backup features—relying instead on the widespread support for the vCard data format for data entry.

There is a significant market for applications that "synchronize" contact records between different devices. The known solutions have some significant disadvantages. The object of the solutions typically involves copying a contact record from one device and adding it to another device. If the devices have the same record, these systems compare the records to find the most up-to-date version. If the solution cannot determine the most recent version, it typically presents a "conflict resolution" interface to the user, or provides a default setting that enables one system's record to prevail. As people attempt to synchronize more than two devices, the number of records to compare increases—impairing performance. When synchronization solutions attempt to retrieve data from applications behind corporate firewalls, the firewalls can undermine the synchronization solution by blocking inbound network requests. Additionally, as people increasingly adopt wireless communications devices, they may find that uploading data from these devices may also present significant performance issues. Prior art synchronization systems also have a tendency to create duplicate records, because users typically enter the minimum information necessary for a particular device (e.g., name and email address for email applications; name and phone number for phones).

Recent solutions have coupled synchronization solutions to electronic address book backup solutions. By providing a centralized server for synchronization solutions, the centralized server stores the most recent copy of each record on behalf of a user—enabling the user to enjoy synchronization and backup in a single application. By augmenting synchronization solutions with a user interface that enables the user to update a record, these solutions purport to offer updates, synchronization and backup in a single solution. The drawbacks to these solutions include limited update functionality (i.e., it is up to the user to enter the update), no ID-based automatic data entry, and reliance on traditional synchronization solutions.

Prior art also involves presence detection technologies that have the ability to provide information of the presence of a device or user at a particular location. U.S. Pat. Nos. 7,110,773 and 5,659,596 describe such technologies. Presence detection technologies are also common with instant messaging applications and VoIP solutions. However, presence detection technologies do not appear to aggregated presence indicators of a user or device for a variety of different technologies and make that information available to others directly in their contact address books.

Therefore, there is a need for an improved system and method for contact management.

SUMMARY OF THE INVENTION

In an embodiment of a method of providing contact information in the present invention, the method includes creating a contact record in a contact management system, where a process associated with a subject of the contact record and/or a recipient of data associated with the contact record is included in creating the contact record. A unique serial number is generated corresponding to the contact record and the serial number is conveyed to the recipient. A request by an application is received for the contact record from the contact management system corresponding to the serial number and data associated with the contact record is transmitted to the application.

BRIEF DESCRIPTION OF THE DRAWINGS

FIG. 3 illustrates an embodiment of a method associated with a group serial number;

FIG. 4 illustrates an embodiment of a method associated with a role serial number;

FIGS. 6a-6c illustrate search request and result data structures;

FIGS. 7a-7c illustrate contact request and reply data structures;

FIG. 11b illustrates a contact management application of the network device of FIG. 11a;

FIG. 15a-15b illustrate third party application interoperability with the contact registry server;

DETAILED DESCRIPTION OF EXEMPLARY EMBODIMENTS

Figure 1:
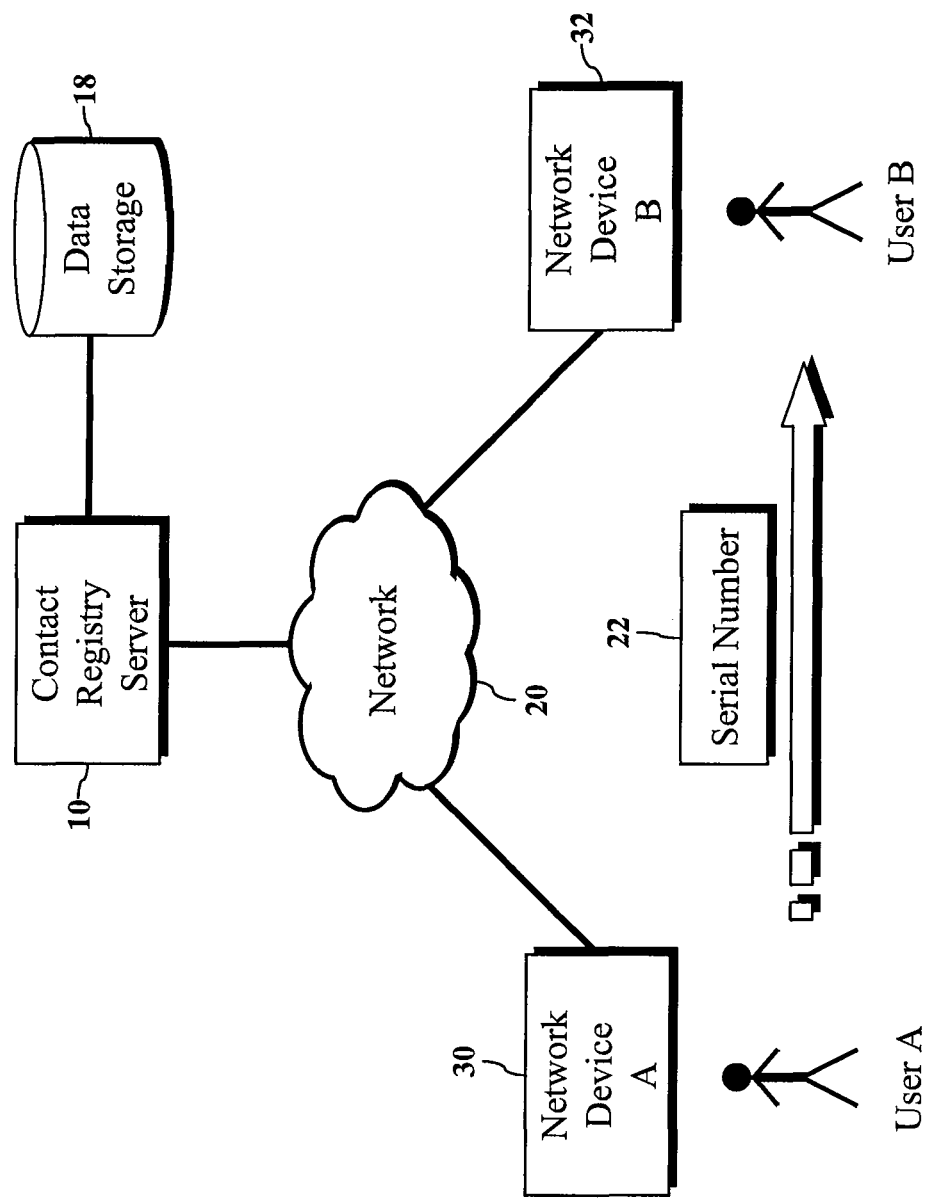
FIG. 1 illustrates an embodiment of the contact management system and method of the present invention.

As will be further described below, one aspect of the present invention includes a user creating and storing a contact record in a contact management system, the system generating and storing a unique serial number corresponding to the contact record, and the user conveying the serial number to a recipient. The recipient may then enter the serial number into a network-enabled computer application and request, via the application, the corresponding record from the contact management system. In response, the application receives data associated with the contact record and stores the data in the application's database, or receives an indication that approval from the owner of the contact record is required before the contact management system will transmit the requested contact record.

In another aspect of the present invention, the recipient enters a serial number into a network-enabled computer application and requests, via the application, associated contact information from the contact management system corresponding to the serial number. The contact management system determines whether approval is required, and if so, responds to the recipient indicating that the request requires prior approval from the owner of the contact information. Following an approval of the request, the contact management system provides a method to receive data associated with the contact information.

In another aspect of the present invention, a person does not have a serial number to enter into an application, and instead enters search criteria such as a person's name and phone number, email address, location (e.g., city, state and/or zip code), or other criterion. The contact management system responds by providing the serial numbers of potential matches. The person (now a serial number recipient) may select a serial number to request a contact record from one of the matching search results. In another aspect of the present invention, a user creates and stores a contact record and serial number that includes "keyword" entries that enables other users to search for the contact record by keywords (e.g., plumber, pizza, gardening services, etc.). Keywords enable people to search for contact records of other users they don't already know, thereby making the service useful for business vendors, affinity groups, and other population groups.

In another aspect of the present invention, a method for receiving data following a request for a contact record that requires the record owner's approval includes the steps of automatically creating and storing a request record with a unique serial number to identify the record. The date and time of the request is logged in the request record, and the requestor is prompted for additional information to be stored in the request record including the requestor's name, user name and contact information (such as an email address) and other information to facilitate the approval process, such as the requester's serial number or a note field for specifying the purpose of the request. Next, the user responsible for approving the request is notified and provided with an interface for approving or rejecting the request. The requester is provided with status updates of the approval process as needed. After the request is approved, the corresponding contact information is available to be received by the requester.

In other aspects of the present invention, a requestor may receive updates for requested records, synchronize multiple devices by replicating requests as an alternative to traditional synchronization, and restore an address book with previously requested records as an alternative method of backing up contact records. The present invention, therefore, provides a means of searching for contact records, exchanging contact information via serial numbers, approving requests, accelerating data entry, receiving updates, synchronizing multiple devices quickly and securely, and providing a means of backing up and restoring contact records in one solution.

In other aspects of the present invention, technology which indicates the presence of a user at a location on a network indicates to the recipient of the serial number and contact record where the user may be most easily reached.

Continuing with the description of the invention, an exemplary embodiment will be described with reference to FIG. 1. A Contact Registry Server (CRS) 10 provides contact management services to a plurality of network devices, such as network devices 30 and 32, through a network 20. The CRS 10 includes at least one computer adapted for communication with the network 20, and a data storage 18 storing contact information. The network 20 includes any system or systems capable of facilitating communications between the CRS 10 and the network devices 30 and 32 and, in various embodiments, may include the Internet, a wireless network, an intranet or a Public Switched Telephone Network (PSTN). Each network device 30 and 32 is adapted for communications with the CRS 10 through the network 20, and may include a mobile telephone, personal digital assistant, vehicle navigation system, personal computer, portable computer, VoIP telephone or other network-enabled device.

Figure 2B:
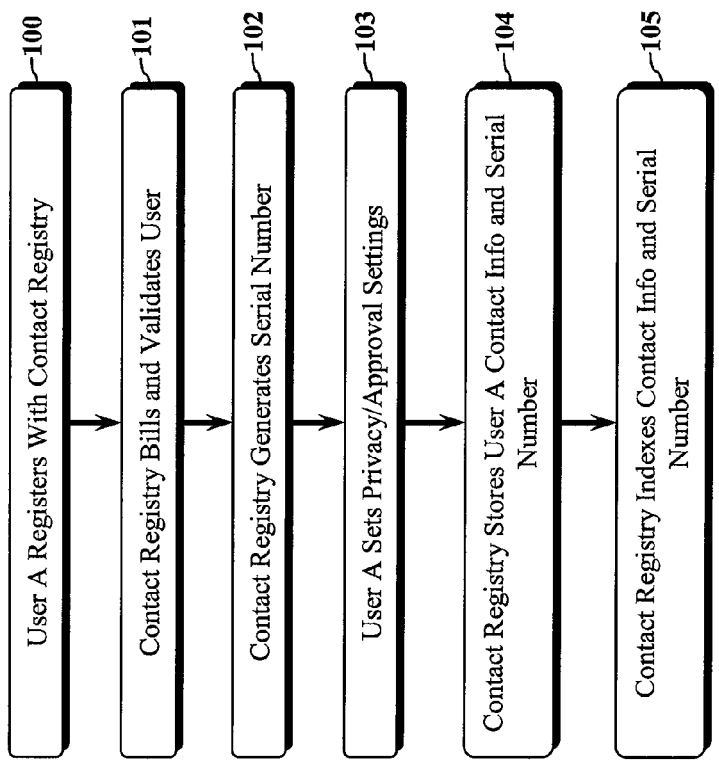
FIGS. 2a-2f illustrate embodiments of methods of the present invention.
Figure 2A:
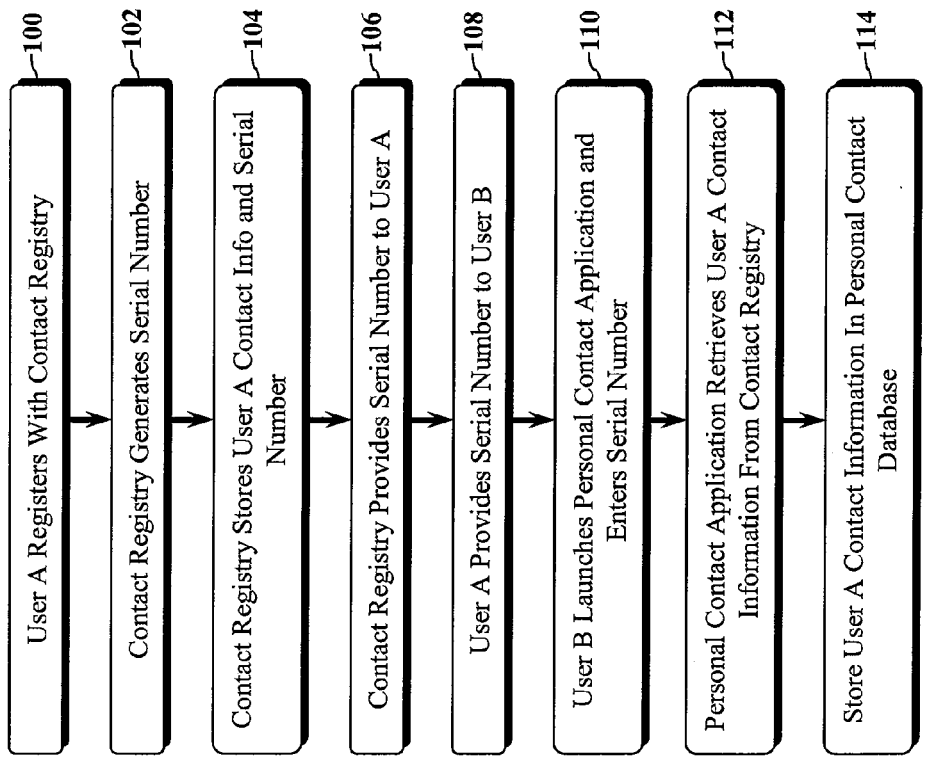
Figure 2C:
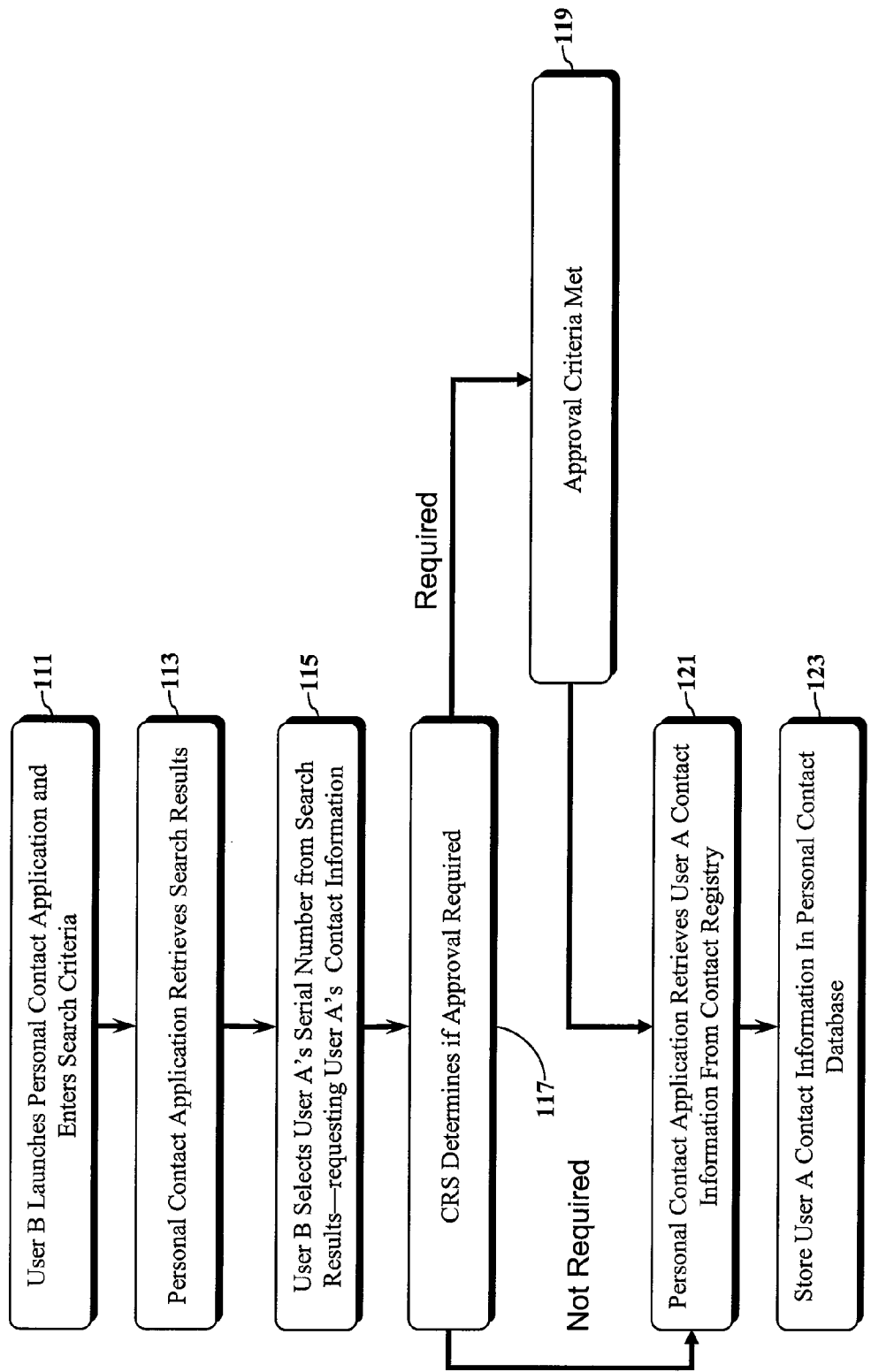
Figure 5:
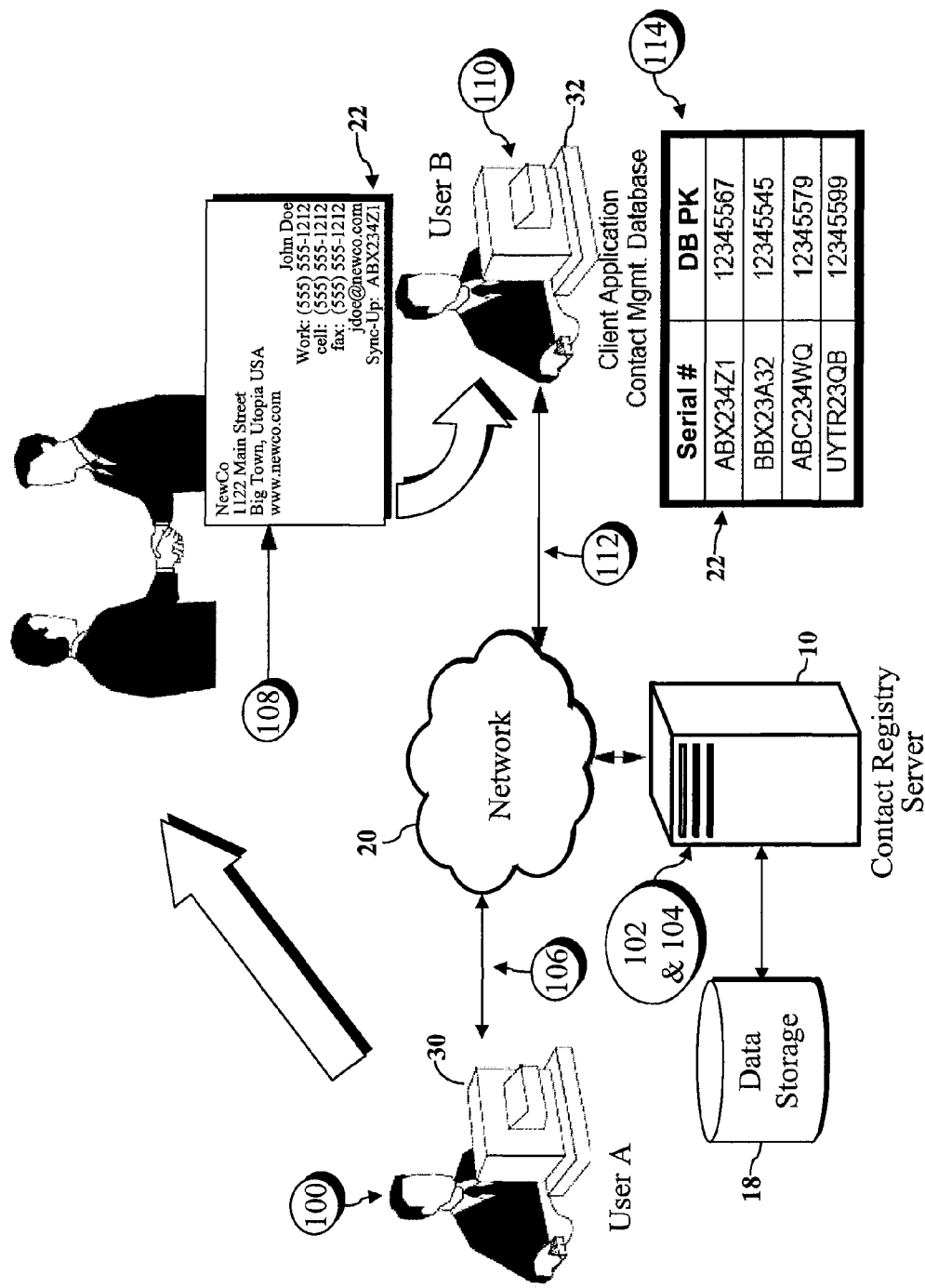
FIG. 5 illustrates an embodiment of the contact management system and method of the present invention.

Referring to FIGS. 2a-2b and FIG. 5, an operation of the embodiment of FIG. 1 will be described. In step 100, a first user, User A, registers with the CRS 10. Registration provides User A with permission to store, maintain and disseminate contact information via the CRS 10. In one embodiment, User A establishes communication with the CRS 10 through the network device 30 by launching a web browser application and entering or selecting a Uniform Resource Locator (URL) of the CRS 10. Through web pages served by the CRS 10 to the network device 30, User A invokes a new user registration process.

User A enters a unique username and password combination for use by the CRS 10 to identify and authenticate User A in subsequent visits to the CRS 10. Alternatively, a temporary password is automatically generated by the CRS 10 and may be changed later by User A after the first login session. In one embodiment, communications between the network device 30 and the CRS 10 during the registration and login process are encrypted (e.g., using the Secure Socket Layer (SSL) protocol) providing a layer of protection against the unwanted access to, or dissemination of, personal contact information.

Referring to FIG. 1 and FIG. 2b, through web pages served by the CRS 10 to the network device 30, User A may invoke a user billing and verification process 101 by providing credit/debit card billing information to the CRS 10, including the name on User A's credit card. Through a gateway to a credit card transaction processor, the CRS 10 charges User A's credit card and verifies User A's name and billing information. If User A's name and billing information are successfully processed, the CRS 10 stores an attribute in the data storage 18 indicating that User A's name is verified. In one embodiment, the CRS 10 utilizes a third party address verification service. In one embodiment, the CRS 10 sends a confirmation email containing a hyperlink to the CRS 10 along with a confirmation code. When the user receives the email and clicks the hyperlink, the CRS 10 validates that the specified email is a valid email address. In another embodiment, the CRS 10 is adapted to periodically present a user interface to User A that prompts User A to certify that the information in User A's user profile and contact records is true and correct. In other embodiments, a user may mail, email, or fax an official document such as a telephone bill to confirm that User A is a real person. CRS 10 may provide various means of indicating to the recipient of a serial number and contact record that User A is a real and interested person (i.e., as distinguished from a trial user or a "bot" that registers a user for surreptitious purposes).

In step 102, the CRS 10 generates a unique Serial Number (SN) 22 to identify User A's personal contact information. The SN 22 may be any unique identifier that is amenable for user input into a network device. It may include all numbers, all letters, an alphanumeric combination of numbers and letters, and is not limited to any particular sequence of numbers and/or letters. In the exemplary embodiment, the contact registry server 10 generates a 9-digit SN 22. The SN 22 includes a concise 8-digit alphanumeric string that is automatically generated or alternatively entered by User A, and a 1-digit alphanumeric error detection code is appended. The CRS 10 queries the data storage 18 to ensure that the generated SN 22 is unique—i.e., is not already in use by the CRS 10 to identify personal contact information. An automatically generated serial number 22 may incorporate naming conventions such as portions of the user's name and/or company name. User selected serial numbers and the generation of serial numbers in accordance with naming conventions results in serial numbers being potentially easier to remember.

Alphanumeric characters enable the CRS 10 to issue concise serial numbers 22 with an extensive address space that can accommodate millions of users. For example, over 2.8 trillion serial numbers can be generated using only 8 digits of case-insensitive alphanumeric characters, where each character has 36 possible values (e.g., 0 through 9 and A through Z). Alternatively, the SN 22 may include characters from other character sets to accommodate different languages and cultures, including non-Western character sets such as Kanji. In one embodiment, an extended character set known as the Unicode character set is used.

When User B enters a 9-digit SN 22, the network device 32 can detect certain data entry errors by verifying the accuracy of the error detection code and notify User B when an invalid SN 22 is detected. The error detection code may be generated using conventional error detection algorithms such as CRC-8 (Cyclical Redundancy Check), a parity bit algorithm, or other error detection algorithms.

In an alternate embodiment, the CRS 10 is adapted to generate serial numbers 22 of varying length, and further adapted to generate an error detection code that can check both the order of characters (e.g., as in Cyclical Redundancy Check (CRC) algorithms) and the length of the preceding string of characters—enabling the CRS 10 to set and determine valid lengths for serial numbers in a system of variable length serial numbers. The CRS 10 may also be adapted to receive a user-defined serial number 22, where the user can create an easily remembered or "personalized" serial number 22 with or without the benefit of an appended error detection character.

In one embodiment, the CRS 10 is adapted to generate serial numbers 22 that are amenable to input on hand-held devices such as mobile phones. In one embodiment, the CRS 10 generates a serial number that is easy to input when using Text on 9 Keys (T9). Since typing text on a cellular phone may require multiple key presses, for example, the number "2" may also represent the letters "a", "b", and "c" in ordinal precedence, the CRS generates a serial number 22 such that it prefers the first letter available on a T9 keyboard (e.g., the letters a, d, g, j, m, p, t, and w are preferred to letters c, f, i, l, o, s, v, and z).

After a unique serial number 22 is generated, a filtering function may be applied by the CRS 10 to determine whether the SN 22 is valid based on stored criteria. In one embodiment, the data storage 18 includes a table of offensive words, phrases and character patterns that are utilized by the filtering function to determine whether the SN 22 includes a word or pattern of characters that may be deemed offensive. If the SN 22 is not valid, then a new SN 22 may be selected.

In step 103, User A may specify privacy and approval settings, which determine whether User B may make a contact request for the serial number 22 via the CRS 10, and whether User A must approve a contact request before disseminating the contact record as a contact reply.

In step 104, a data record is created in the contact management database of data storage 18 for User A, and the unique serial number 22 is stored therein. The record includes a field for the SN 22 and other fields that are common in contact management databases, such as name, address, telephone number and email address. In one embodiment, User A is provided an opportunity to populate the database record with personal contact information through a web browser interface. The CRS 10 may also store additional information, such as user account information and user preferences, including whether approval from User A is required before the CRS 10 disseminates User A's contact information to third party requesters.

Referring to step 106 of FIG. 2a, the CRS 10 communicates the serial number 22 to User A via the web browser interface on the network device 30 or, alternatively, via another supported method of conveyance, such as an email message to User A. In alternate embodiments of steps 100-106, third party applications may be adapted via plug-in technologies, Web 2.0 mash-up technologies (Asynchronous JavaScript and XML) or other approaches to present the user interface for registering with the CRS 10 and generating a serial number 22 and contact record.

To protect against the unwanted dissemination of User A's unique serial number and contact information, the data may be encrypted before it is stored in the data storage 18.

Figure 9A:
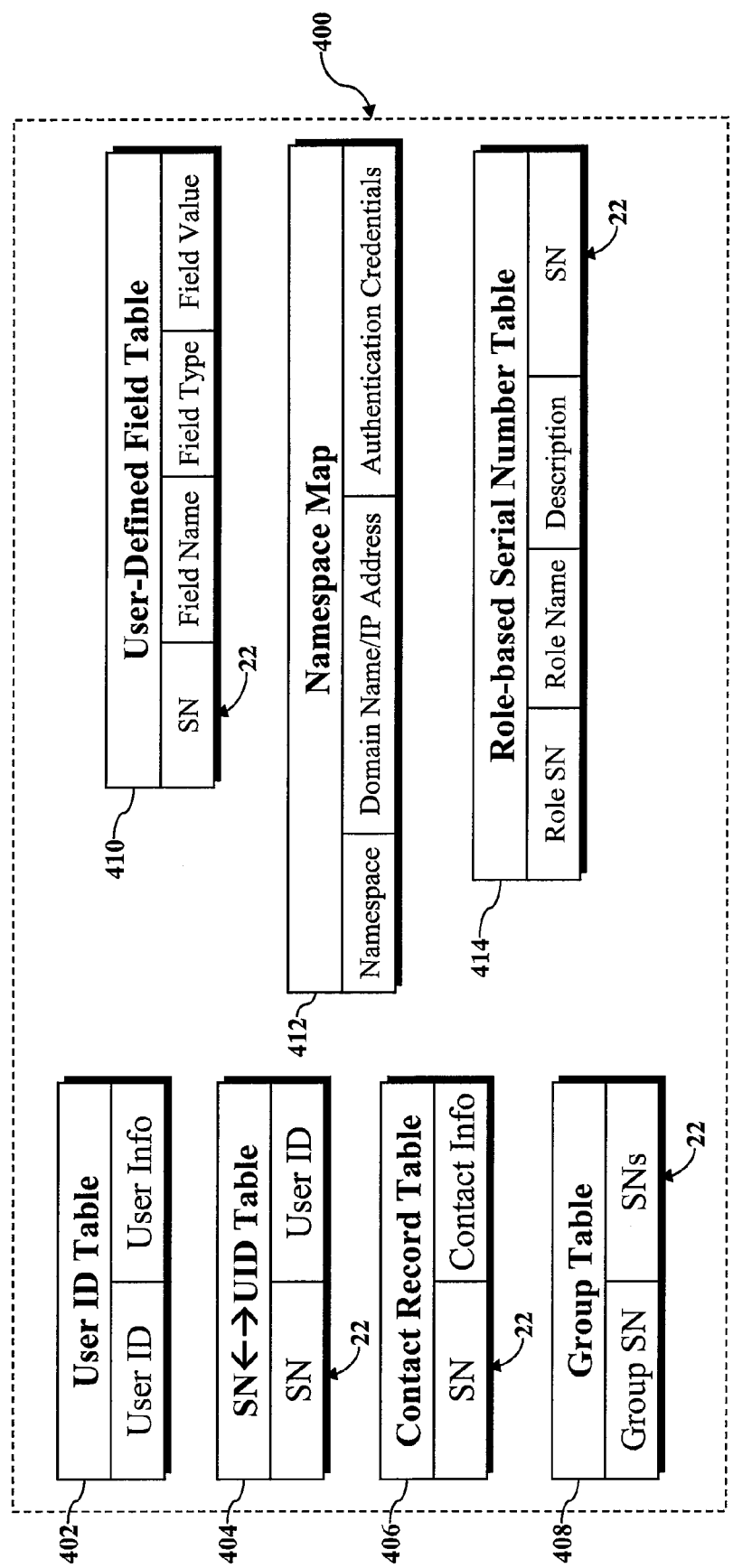
FIGS. 9a-9b illustrate data structures which may be used by the database server of the contact registry server for storing data in the data storage.

In one embodiment, User A may create and store one or more user-defined fields in a record by specifying a field name and a value, as illustrated in FIG. 9a. User-defined fields make it possible to customize a contact record (e.g., a contractor's license, an industry sector classification, etc.).

In one embodiment a search index manager processes the contents of the contact record and data is added to the data storage 18 for use with a search index processor. When a user submits search criteria in a search request that corresponds to data in the contact record, the search index processor may return the serial number 22 and other information associated to the contact record as a search result along with other matching search results. These functions enable a person to search the CRS 10 to find a serial number 22 associated to a user without first receiving the serial number 22 from that user.

In one embodiment, the CRS 10 and the network devices provide search field(s) enabling a user to submit a person's name, telephone number, email address or other criteria and retrieve an associated serial number(s). The CRS 10 optionally enables registered users to specify whether other users may search for their contact record by name, telephone number, email or other criteria to prevent undesired access to their serial number and contact record.

In one embodiment, the CRS 10 provides interfaces that enable leading search engines to generate and submit a search request and receive a search result or a list of search results. Leading search engines may be further adapted to make a contact request and receive a contact reply. Thus, a person may search for another person's contact information conveniently by using widely adopted search engines in lieu of accessing the CRS 10 directly.

In one embodiment, User A stores one or more text profiles in the contact record 406 (FIG. 9*a*) that provide User B with information distinguishing User A from other users (e.g., when User A has a common name such as "John Smith"). The text profile does not require approval from User A to view its contents. In one embodiment, User B searches for User A's contact record without the benefit of User A's serial number 22 by inputting search criteria and submitting a search request. The CRS 10 via a search index processor provides a search result with multiple records—e.g., numerous serial numbers from different users named "John Smith". Without additional information, User B may not know which serial number to request. User B can examine the profiles presented with the search results to help determine which serial number corresponds to User A. In another embodiment, User B receives a request from User A, but cannot distinguish User A from other users without the benefit of additional information. User B can examine the profile presented with the request to determine if the serial number corresponds to User A.

Referring to step 108 of FIG. 2*a* and FIG. 5, User A conveys the serial number (SN) 22 to User B. User A may print the SN 22 on a business card and provide the business card to User B, type the SN 22 into an email message and send it to User B, verbally convey the SN 22 to User B or provide the SN 22 through another mode of conveyance. In one embodiment, the SN 22 is conveyed, along with an associated trademark that identifies the source of the SN 22 and the associated CRS 10. For example, User A may convey the SN 22 in the form "SyncUp: JDOE25Z2C," where "SyncUp" is a promoted trademark identifying the source of the SN 22, making it clear what the number conveys. In this embodiment the SN 22 isn't just a serial number printed on a business card, displayed in an email, or conveyed verbally, it is conveyed in association with a trademark to distinguish it from other serial numbers and addresses such as email addresses and phone numbers.

Referring to step 110 of FIG. 2*a* and FIG. 5, User B enters the serial number into a contact management application on network device 32. In one embodiment, User B launches the personal contact management application on the network device 32 that includes a blank serial number input field identified by a common name or trademark. The personal contact management application is adapted to transmit an entered serial number 22 to the CRS 10 and requests corresponding contact information associated with User A. User B can rely on the accuracy of the information entered into the CRS 10 by User A, which presumably has been verified and kept current by User A.

In one embodiment, another security measure implemented by the CRS 10 includes detecting contact requests with random or invalid serial numbers, and denying access to users and/or network devices 30-32 who attempt to access personal contact information without authorization from the CRS 10 or the user associated with the contact information. For example, a registered user of the CRS 10 may be denied access to the system after numerous failed attempts to enter a valid serial number 22. Invalid serial numbers may be detected, for example, if the entered serial number 22 includes too many or too few digits, if the serial number 22 has not yet been assigned to a user, or if an error detection code is invalid. In one embodiment, the CRS 10 first processes each request as a search request, and the user may make a contact request by selecting a serial number 22 from the search results. The CRS 10 may employ search engine capability to ensure that a user never directly submits an invalid serial number 22, thus, improving both performance and security.

The contact request is transmitted from the network device 32 to the CRS 10 and may include a "User ID" for authentication of the requestor, a "Device ID" to identify a network device for logging and synchronization of stored contact information, a "Reply Type" or a "Device Type" for identifying a data format or protocol associated with the network device 32, a "Request Type" indicating if the contact request is for a new record, an update, or a deletion (among other possible request types), and the requested serial number 22.

In another embodiment, the contact request includes a category (e.g., work, home, personal) to associate the requested serial number 22 with a request context. In this embodiment, synchronization requests can filter contacts by category so that network clients 30 can synchronize only a subset of the contact records (e.g., only synchronize "work" contacts to the user's cellular phone). In one embodiment, a network device is adapted to provide a default categorization to a requested contact (e.g., if the network device is a social blog, the network device categorizes the requested contact as "friend" by default, etc.). In another embodiment, when User B requests a contact, the CRS 10 is adapted to categorize the contact automatically according to location-based attributes (e.g., all contacts within a particular city).

The contact requester may also offer one of his or her serial numbers when making a request for the contact information of another user. The CRS 10 may present the offered serial number to the user associated with the requested serial number, and the user may accept or decline the offered serial number. In one embodiment, the act of offering the serial number electronically serves as approval criteria if the offered serial number would otherwise require approval before disseminating contact information.

Figure 10:
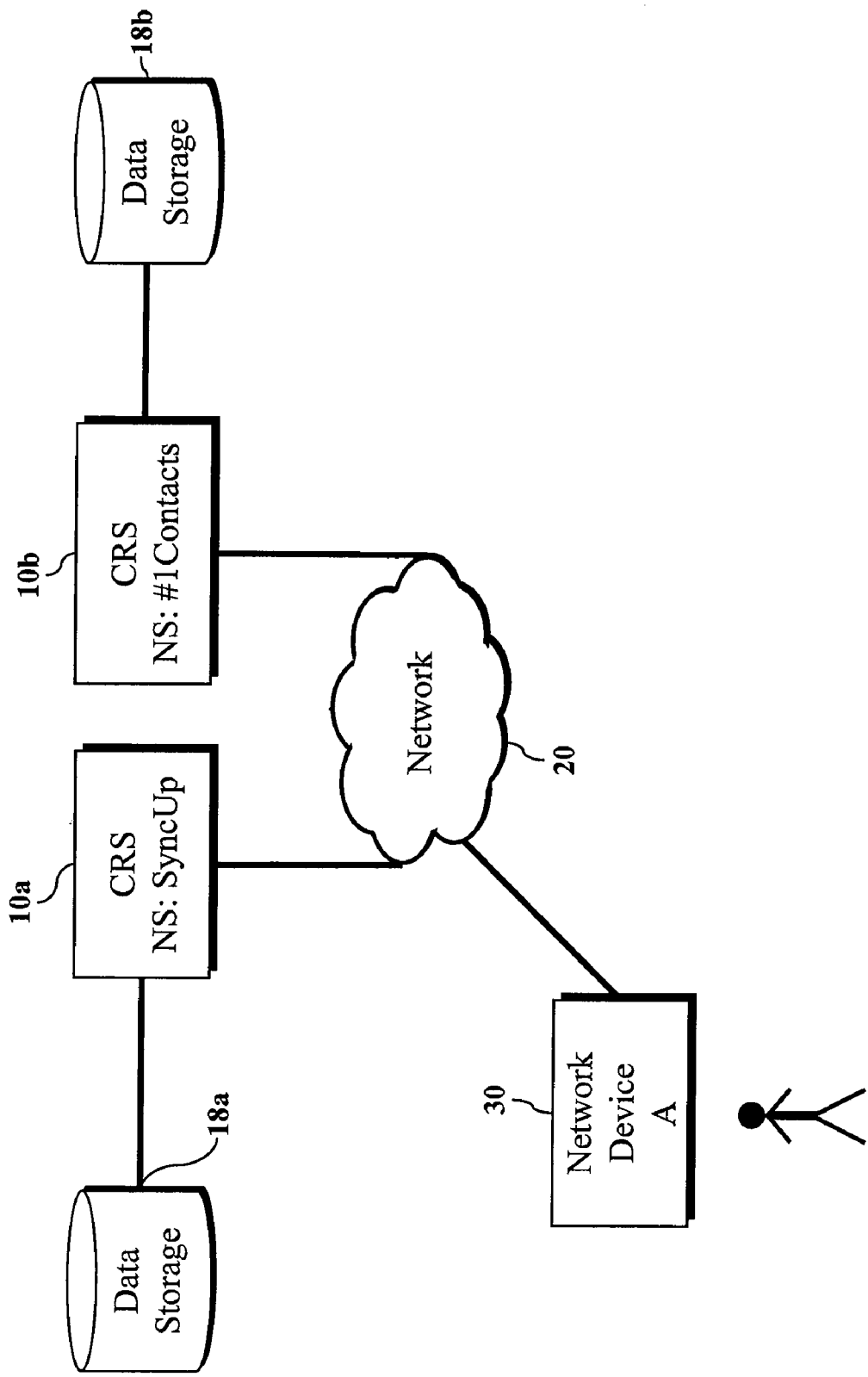
FIG. 10 illustrates a namespace redirect function of the present invention.

In one embodiment a request to the CRS 10 expresses the serial number 22 in Uniform Resource Name (URN) syntax (i.e., RFC 2141), such as "SyncUp:///JDOE24Z/C," where the "SyncUp://" portion of the syntax represents a namespace. Referring to FIG. 10, if the instant system 10*a* processing the contact request does not have records within that namespace, it may relay the request to a system 10*b* that does store records with the provided namespace. In one embodiment, a namespace redirect function looks for the address of a separate system using a namespace map record, and redirects the request to that system and provides the contact reply to the requester. Thus, with the present invention, users may utilize one service to access the records of another service via the namespace parameter (e.g., SyncUp://) prior to submitting the serial number 22.

In one embodiment, the contact request and contact reply further include a 2-digit or 3-digit language abbreviation and a 2-digit country abbreviation. The 2-digit country code may be specified in accordance with International Standards Organization (ISO) ISO 3166-1 (e.g., US, UK, JP, etc.), and the language may also be specified in two digits in accordance with ISO 639-1 or three digits in accordance with ISO 639-2 (e.g., DUT: Dutch; ENG: English; FRA: French; JPN: Japanese.) Alternatively, the contact request and contact reply further include a character encoding in accordance with ISO 8859, UTF-8, UTF-16, ISO 2022, and others. For example, a request from a Russian-speaking user of a contact management application who resides in the United States may include the term "RUUS" (Russian+U.S.) or ISO 8859-5 (Cyrillic). In this manner, a user doing business in different countries, across different languages, can convey serial numbers 22 encoded in language character sets other than the Roman Alphabet, and the CRS 10 can correctly interpret the serial number 22. Additionally, the contact record may similarly be encoded in different languages.

In one embodiment, a contact record is stored in a first language, such as English, and the CRS 10 receives a contact request identifying the contact record, the request including a code for a second language code, such as Japanese. In this embodiment, the CRS 10 is adapted to translate the stored contact record from the first language to the second language and return the contact record as a contact reply in a format associated with the second language code.

In one embodiment, User A resides in one country and User B resides in another country. When User B makes a request for User A's contact information, the CRS 10 appends international calling numbers (e.g., +39 in the case of Italy) and adds or removes any necessary prefixes to national area codes or local numbers as required by the conventions of the phone systems in various locales. In one embodiment, the CRS 10 is adapted to translate phone numbers using ITU-T E.164 country codes and identification codes. Adding international prefixes makes it possible for User B to call User A without the difficulties that could be associated with modifying a record to add an international prefix.

In alternate embodiments, approval processes limit access to User A's contact information by requiring prior approval before the contact information is disseminated in response to a user request. The approval processes allow registered users to control the dissemination of their contact information, while maintaining a desired degree of privacy and confidentiality.

Referring to FIGS. 2c-2f, various approval processes may limit access to User A's contact information by requiring prior approval before the contact information is disseminated in response to a user request. The approval processes allow users to control the dissemination of their contact information, while maintaining a desired degree of privacy and confidentiality. In the various embodiments, User B launches a personal contact application on a network device 32 in step 111 and enters search criteria, which is submitted as a search request to the CRS 10. In step 113, the personal contact information application receives search results from the CRS 10. In step 115, User B selects User A's serial number 22 from the search results, thereby submitting a contact request for User A's serial number 22 to the CRS 10.

In one embodiment, User A defines a set of approval criteria to be applied to one or more contact records by the CRS 10. After receiving a contact request (FIG. 7a) for a contact record 406, the CRS 10 determines at step 117 whether approval criteria have been specified for the contact record. If approval is required, the CRS 10 proceeds to step 119 until the approval criteria is met 119 (or disapproved). For example, manual approval by User A may be required prior to releasing the requested contact information in step 121. While the CRS 10 awaits approval from User A, the CRS 10 may respond with an "approval pending" message to User B.

Figures 2D, 2E:
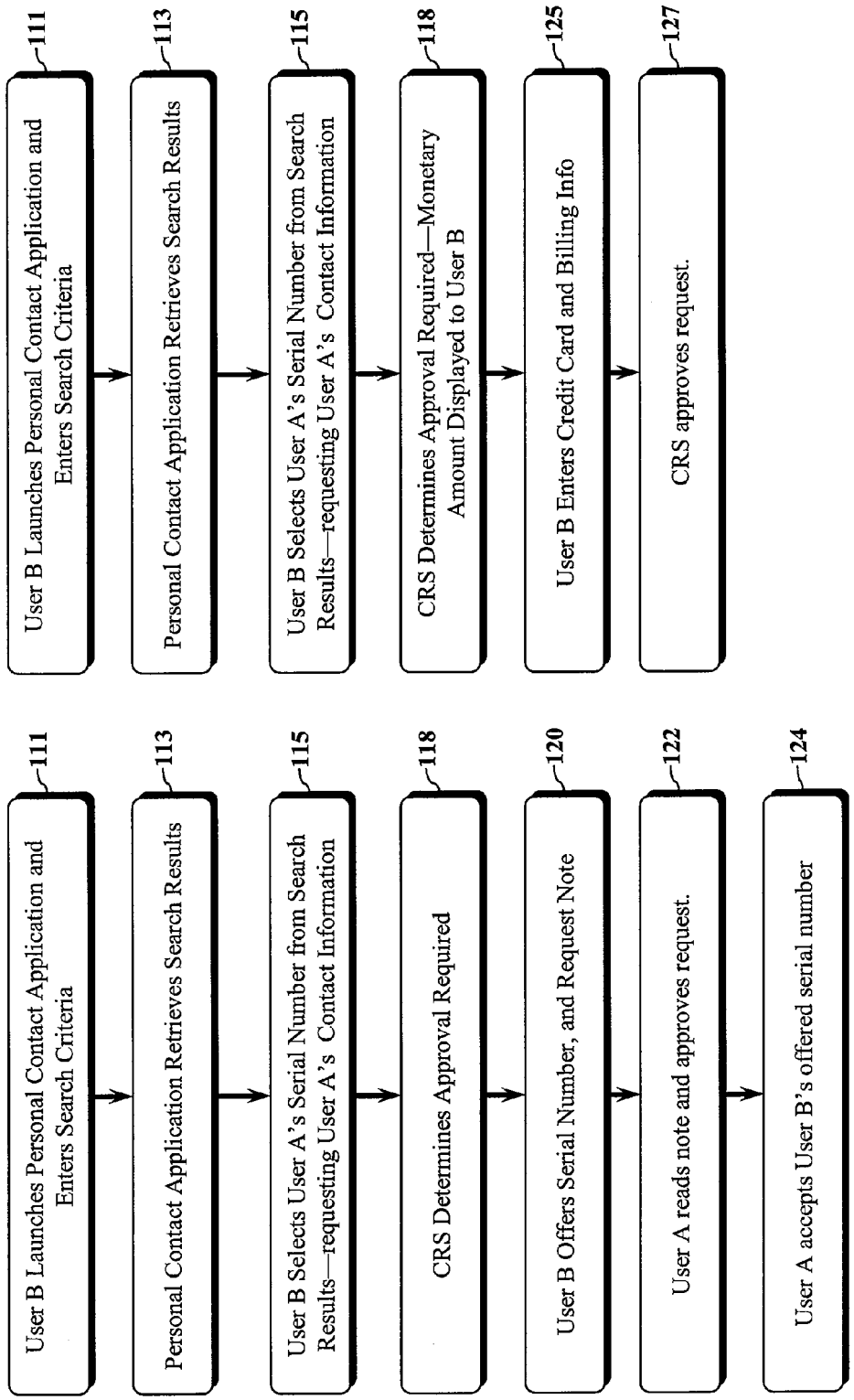

Referring to FIG. 2d, at step 118 the CRS 10 receives a contact request and determines that approval is required. At step 120, User B is prompted to provide a note and to optionally offer one of User B's serial numbers 22 to User A. In step 122, the CRS 10 presents User A with the contents of an approval record and User A approves the request, which spawns a contact reply to User B. In step 124, the CRS 10 presents User A with the contents of an offer record and User A accepts the offer, which results in a contact request followed by a contact reply.

Referring to FIG. 2e, at step 118 the CRS 10 receives a contact request and determines that approval is required, where the criteria for approval is a monetary payment by User B. In step 125, User B is presented with a user interface prompting User B to supply and/or authorize the use of credit card and billing information. Upon verification of payment, the CRS approves User B's request at step 127. Such an approval process may generate revenue for the service provider, and/or User A.

Figure 2F:
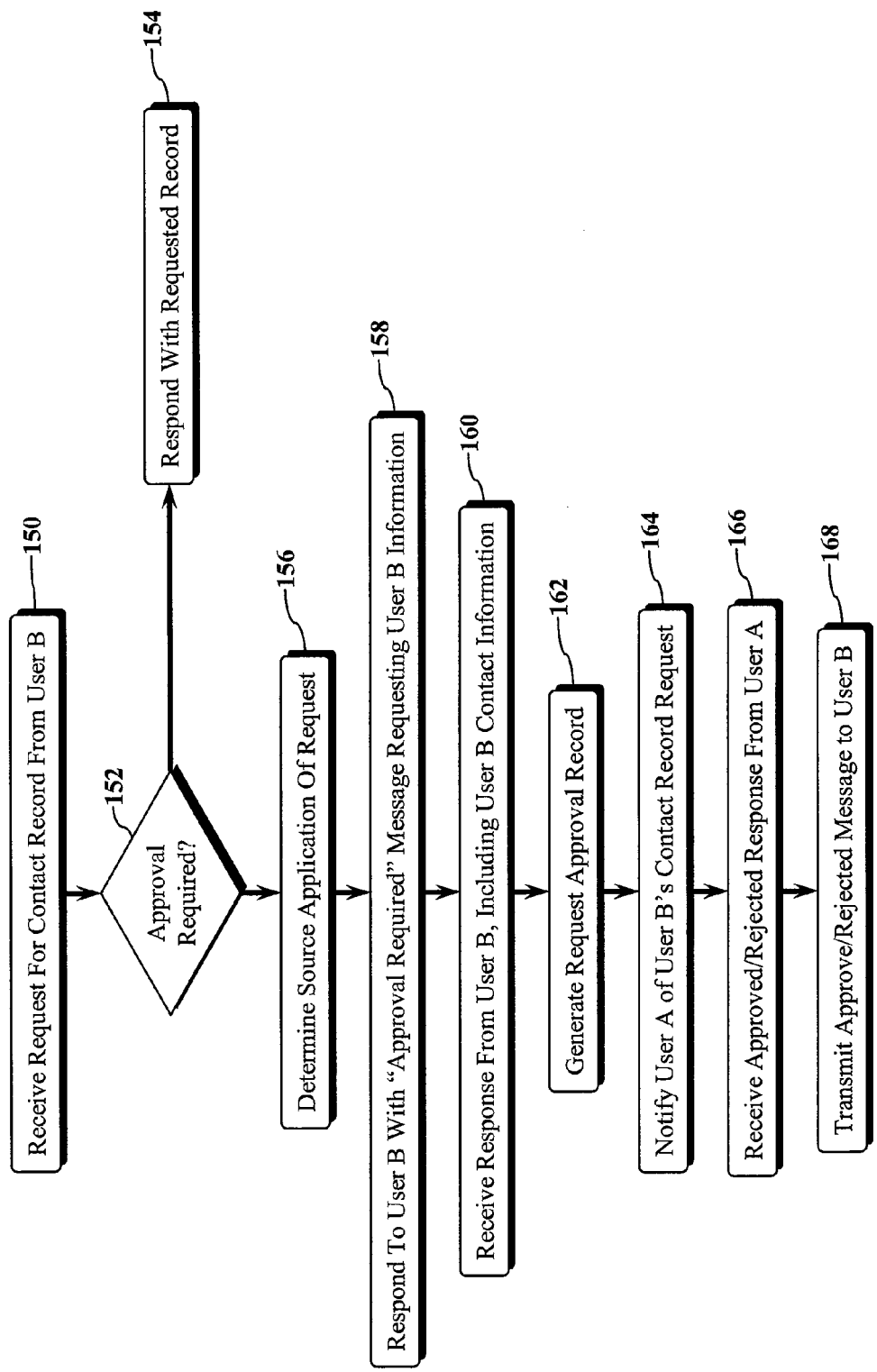

Referring to FIG. 2f, an exemplary embodiment of a web browser-based approval process will now be described. In step 150, User B requests a contact record by submitting a serial number 22 through a compatible end user application, such as by navigating a web browser application to the URL of a contact record request page or selecting a search result within a web page. If approval is required, User A, must approve the request before the CRS 10 can release the contact record to User B (step 152), then the CRS 10 determines the source application of the contact record request in step 156 and responds to User B with an "Approval Required" message in step 158. If no approval is required (step 152), then the CRS 10 responds with the requested record in a format compatible with the requesting application in step 154—a web page or a download for import into the requesting application. By contrast, other embodiments provide different formats such as an XML message, an email or SMS message, or an SS7 packet.

Similarly, the presentation format of the "Approval Required" message may be selected based on the source application. For example, if the CRS 10 determines that the contact request originated from a contact record request web page associated with the CRS 10, the "Approval Required" message may include a web page that informs User B that approval by User A is required. The web page may include a name field identifying User B to User A, an email field indicating an email address where User A sends contact information if approved, and other fields for collecting information from User B to assist User A in approving or rejecting the contact request such as a note field for use by User B to provide an explanation or purpose for the contact record request to User A. In one embodiment, the web page includes a field for User B's serial number 22, enabling User B to offer his or her contact serial number to User A.

In one embodiment, User B enters his or her name, email address, and other requested information into the "Approval Required" web page and submits the information to the CRS 10, which receives the information in step 160. In step 162, the CRS 10 generates an approval record to track the request-approval process. The fields of the "Approval Required" page may contain pre-populated data if User B is logged into the CRS 10, or if User B's contact information is available in a cookie or via auto-fill technologies.

In step 164, the CRS 10 notifies User A that there is a pending request that requires User A's approval. In one embodiment, the CRS 10 sends an email notification to User A. In another embodiment, the CRS 10 notifies User A through an end user contact management application, such as upon login by User A onto the CRS 10 or through a resident service module on User A's network device 30.

Figure 9B:
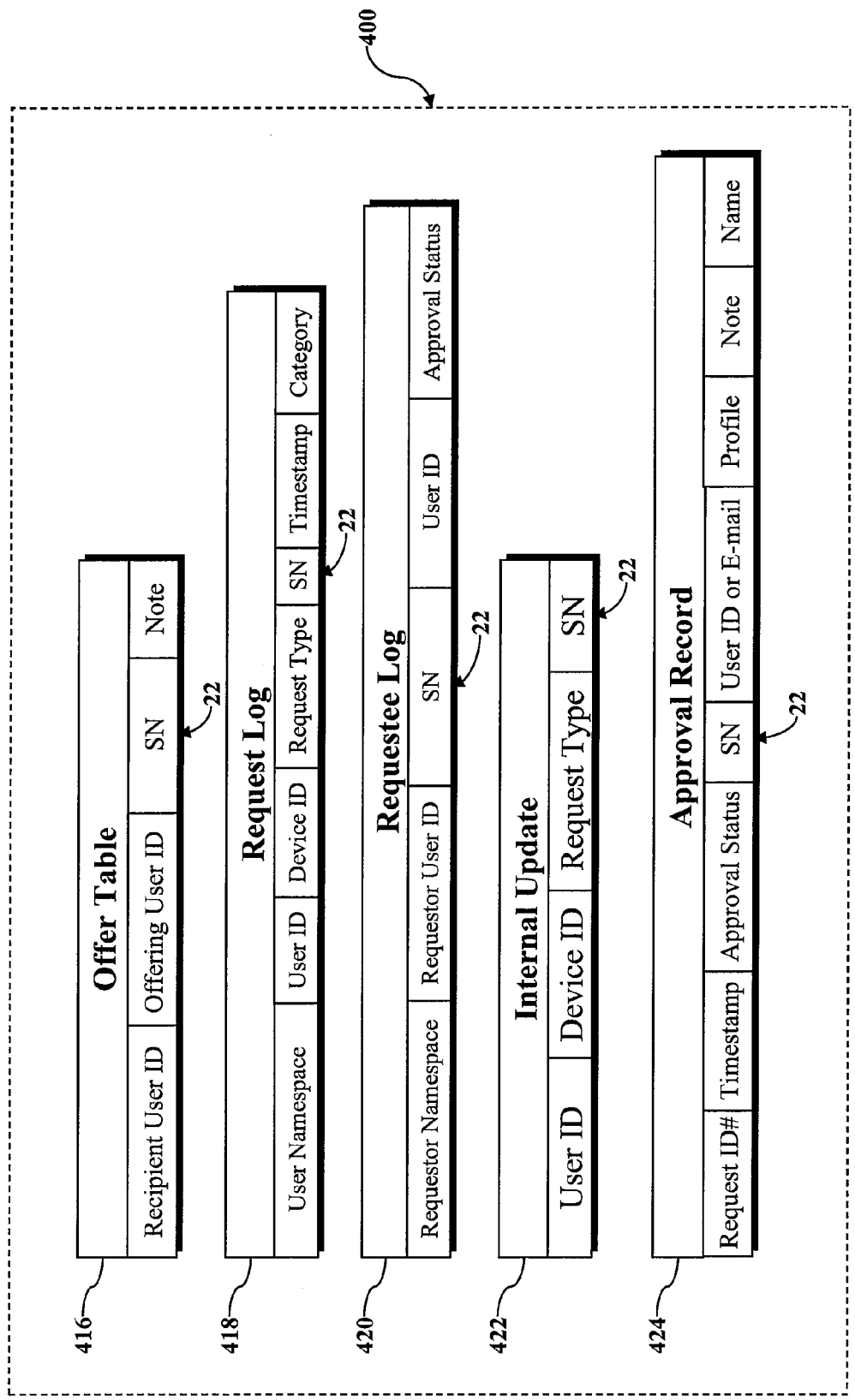

In step 166, User A approves or rejects (or possibly ignores) User B's request. In one embodiment, User A approves or rejects User B's request by logging onto the CRS 10, navigating to an approval/rejection web page, selecting the approval record 424 (FIG. 9*b*) submitted and pressing either an "Approve" or "Reject" user interface button. If User A approves or rejects the request, the CRS 10 changes an "Approval Status" field in record 424 depicted in FIG. 9*b* from "unapproved" to "approved", or alternately from "unapproved" to "rejected" if User A rejects User B's request.

In step 168, the CRS 10 transmits a message to User B indicating the result of the approval process. In one embodiment, if User A approves User B's request, an email message is sent to User B including User A's contact information. The email may include the contact information as unstructured text, as a structured text record attachment (e.g., XML or vCard), or in another format. In alternate embodiments, the email message will include a URL or hyperlink to an approved request web page or a file that enables User B to retrieve the contact information from the contact registry server 10. The messages transmitted between the CRS 10 and User B, including associated email and web pages, may further include advertising which generates revenue for the CRS 10 provider. In an alternate embodiment, a network device adapted for communication with the CRS 10 through an application plug-in receives the result of the approval process in a structured text record such as XML or vCard that is compatible with the requesting application.

In one embodiment, User A defines a Personal Identification Number (PIN) or concise password to be applied to one or more contact records by the CRS 10. When receiving a request for a contact record, the CRS 10 may determine that approval criteria is met for the contact record if the request contains a valid PIN or password, and if so, will provide the requested information. This may be beneficial in a situation, for example, where a person may convey their serial number 22 for a record that requires approval and where the user is not able to make an immediate and needed approval electronically (e.g., when providing a serial number to a receptionist at a hotel, car rental agency, etc).

In an alternate embodiment of an approval process, User B may request access to and use of User A's contact information in accordance with legislative mandates requiring User B to provide User A with a means of controlling access and use of User A's information, such as the EU Directive on Data Privacy or the Health Insurance Portability and Accountability Act (HIPAA). In this embodiment, approval by User A effectuates a binding agreement whereby User A will continually provide User B with accurate information, and User B may only use User A's information in a manner specified by User A. In one embodiment, if User A rescinds approval to User B, User B is directed by a message from the CRS 10 to cease use of User A's information and possibly to remove User A's contact information from User B's devices.

In one embodiment, the CRS 10 provides a "Send to a Friend" feature that enables a user to send his/her serial number 22 to other individuals via email. In one embodiment, the CRS 10 accepts an email address from User A, and contains logic to determine if the submitted email address corresponds to a registered user, such as User B. If the submitted email address corresponds to a registered user, such as User B, the CRS 10 offers User A's serial number 22 to User B automatically using the offer process described herein instead of sending User B an email message. In another embodiment, the CRS 10 contains logic to determine if the email address exists in an anti-spam list, and prevents the sending of an email message if the email address is present in the anti-spam list. If the submitted email does not correspond to a registered user and is not present in an anti-spam list, the CRS 10 sends an email message including User A's serial number to User B. In one embodiment, the CRS 10 adds User B's email address to an approval record with its approval status set to "approved" on behalf of User A. This enables User B to request User A's contact information and receive immediate approval upon submitting the email address, or receive an offer for User A's contact information upon registering as a new user with the CRS.

Figure 14:
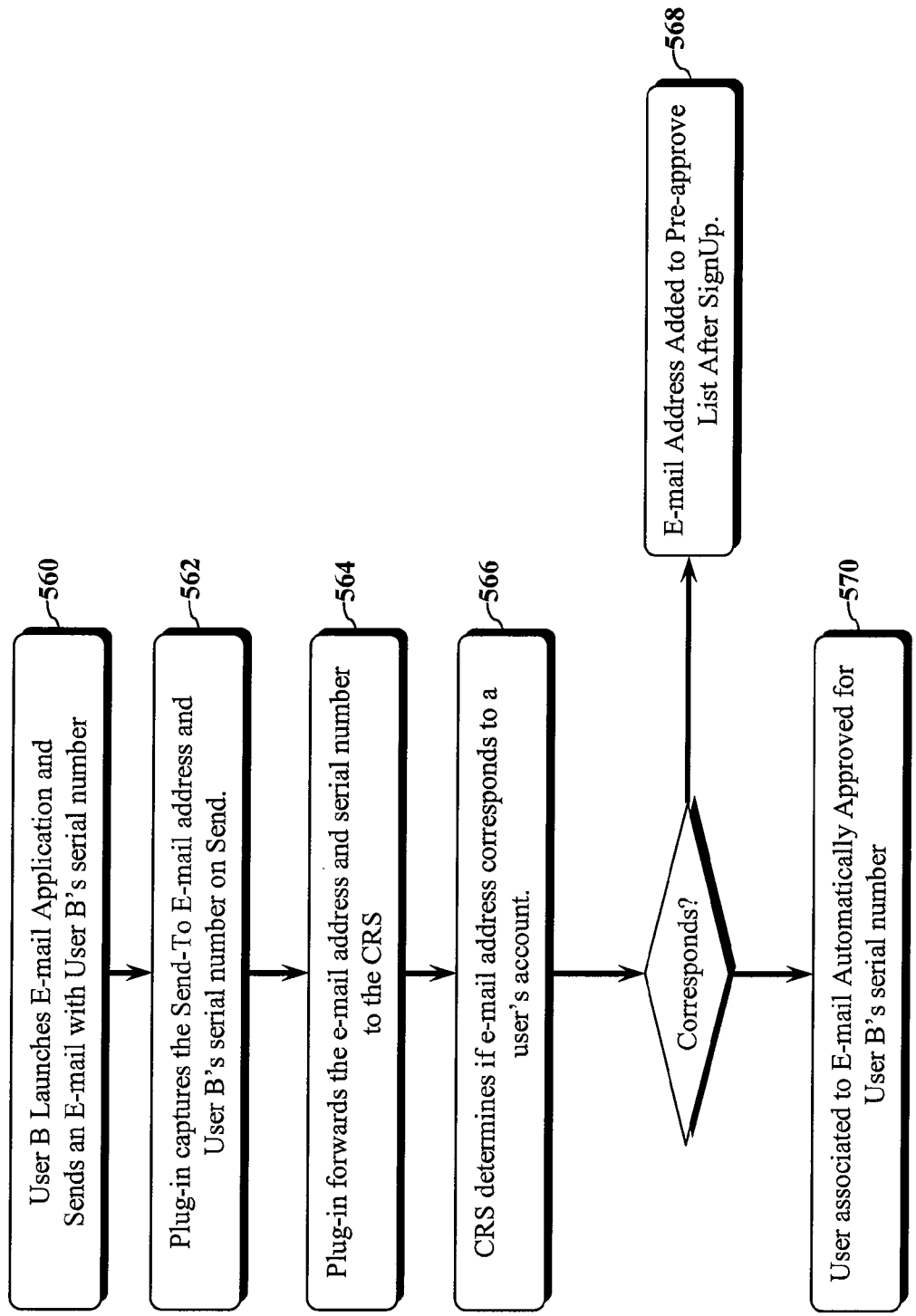
FIG. 14 illustrates an email application adapted for interaction with the contact registry server.

Referring to FIG. 14, in another embodiment User A has an email application adapted for interaction with the CRS 10. The email application contains logic to parse the email application's "Sent Email" folder for "Send-To" email addresses or alternatively to store a copy of sent email addresses as they are sent. In step 560, User A launches the email application and sends an email. In step 562, the plug-in that interacts with the CRS 10 stores a copy of a "Sent To" email address. In step 564, the plug-in sends the email address along with User A's serial number 22 to the CRS 10. In one embodiment, the email and serial number 22 are sent by the plug-in to the CRS 10 automatically. In another embodiment, the plug-in prompts User A asking if User A wants to pre-approve the person associated to the email address. In step 566, the CRS receives an email address and generates an approval record with the approval status set to "approved" and determines whether the email address corresponds to a user's account. If the email address does not correspond to a user account, the email address is stored in the approval record and used to approve the person associated to the email address after they sign up at step 568. In alternate embodiments, the approval record may be used to approve a non-user requesting a contact where the contact information is disseminated to the requester at the same email address. Alternatively, the CRS 10 disregards the email address if the person associated to the email address is not a user. In step 570, the CRS 10 determines that the person associated to the email address is a user, such as User B, and pre-approves (or approves) a request by User B for the contact information associated to the serial number 22 submitted at step 564.

In an alternate approach, User A via the email application sends a serial number 22 to User B in conjunction with a signed Triple Data Encryption Standard (DES) key generated by the CRS 10, User B's email address (which can be used for authenticating User B with the CRS 10), and a timestamp used to limit the duration of approval. Upon receipt of the message, User B may request the serial number from the CRS 10 via the key, and the CRS 10 may authenticate User B via the email portion of the key. Advantages of these approaches include approving anticipated requests before they occur (as User A may include a serial number 22 in the email); and User B may forward an email sent by User A to User C, but User C is not automatically approved by User A in spite of User C's knowledge of User A's serial number 22.

In other embodiments, approval criteria include user specified rules for automatic approval. For example, approval may be limited to requesters who are registered users of the CRS 10, to requesters whose contact information is stored in User A's address book, or other criteria specified by User A. User A may also set up approval levels that differ based on the content of the requested information. For example, User A may have business contact information via one serial number 22 that does not require approval and another contact record and serial number consisting of home information that does require approval.

Figure 8A:
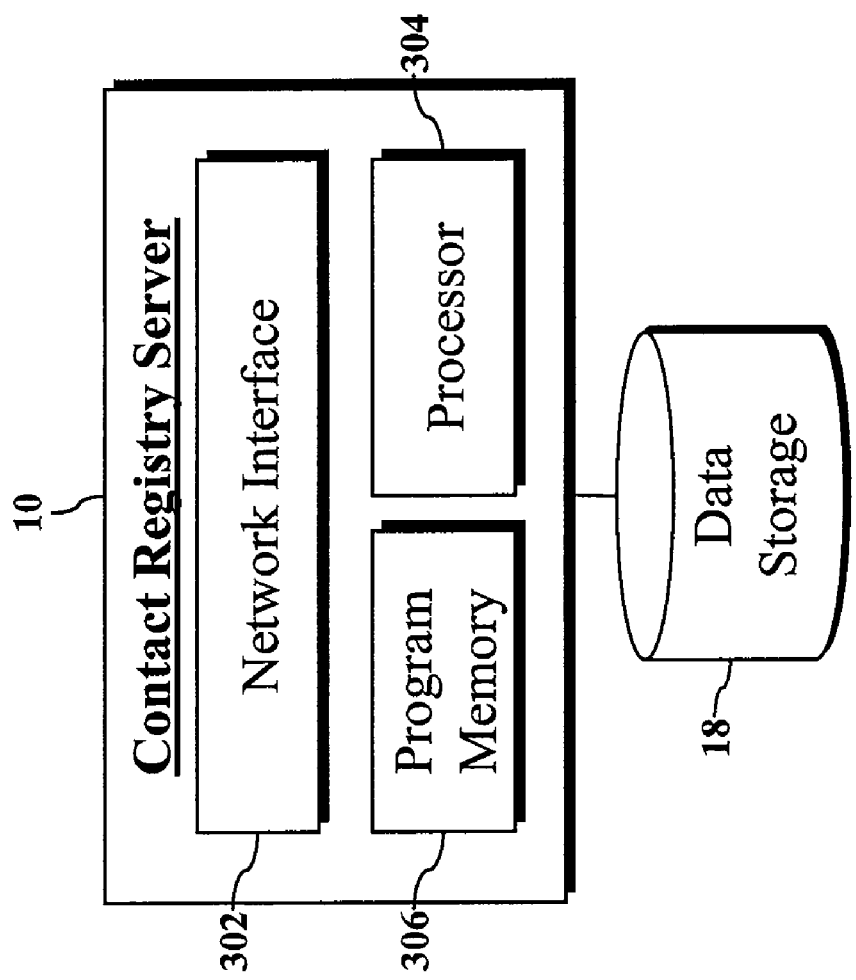
FIGS. 8a-8c illustrate an embodiment of a contact registry server of the present invention.
Figure 8B:
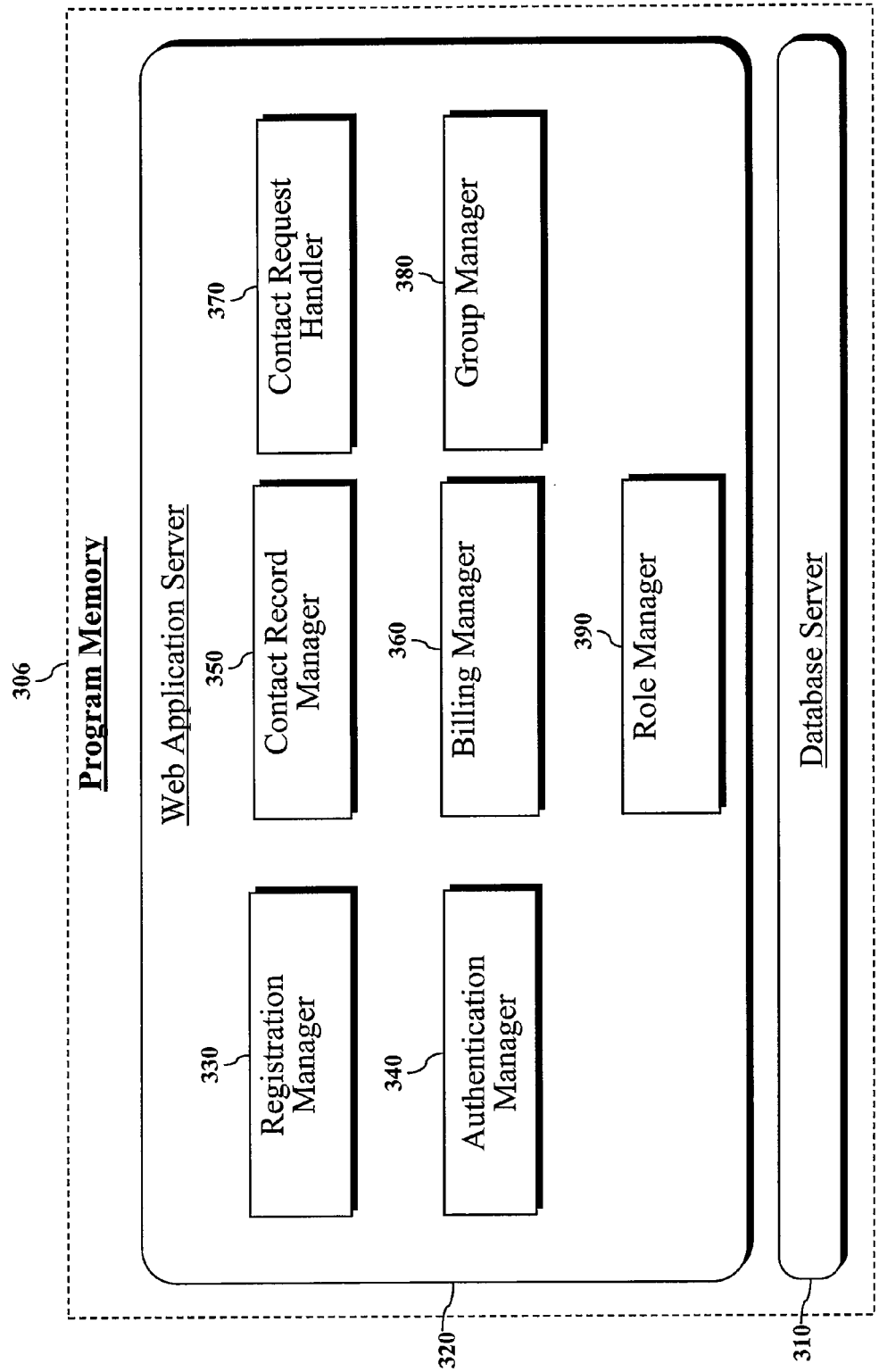
Figure 8C:
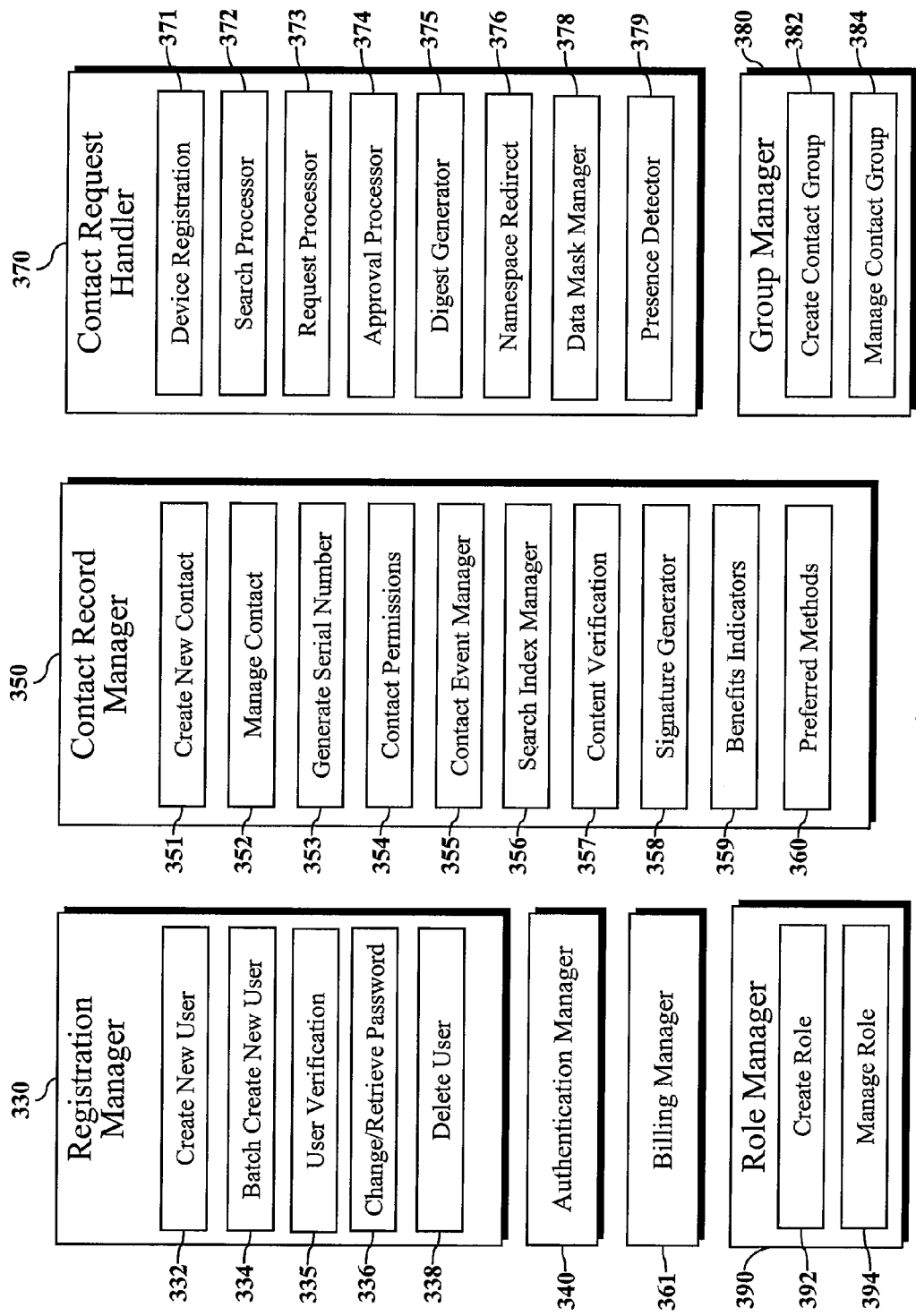
Figure 13:
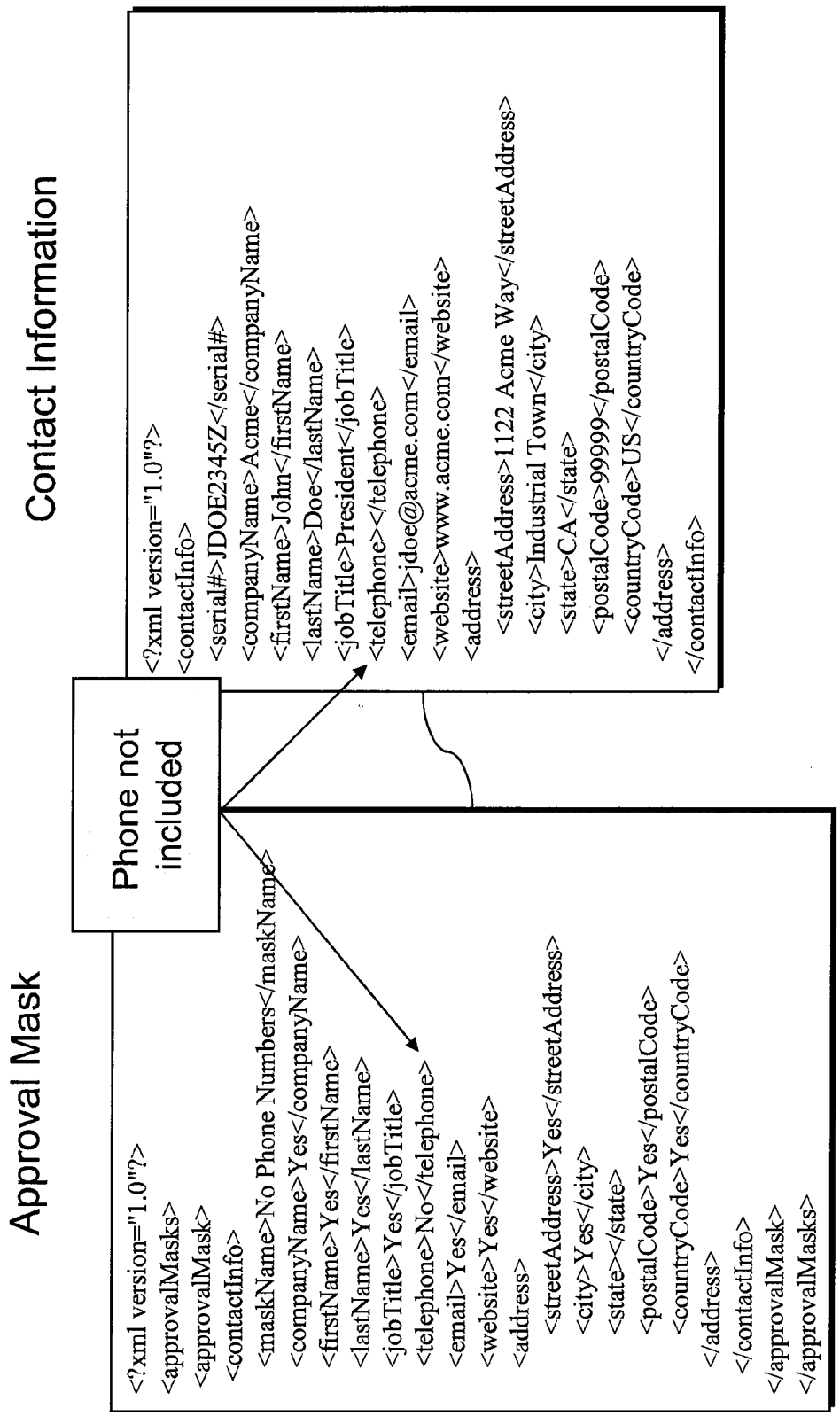
FIG. 13 illustrates an approval mask in accordance with the principles of the present invention.

Referring to FIG. 8c, in one aspect of the present invention, the CRS 10 contains "data mask" logic 378, which enables User A to disseminate particular data attributes within a contact record while preventing the dissemination of other attributes (e.g., providing only phone numbers) by applying a data mask to a contact record prior to generating a contact reply. In one embodiment, the CRS 10 provides logic enabling User A to create a data mask, to specify data attributes to include in a response, to provide the data mask with a name, and to store the data mask in the CRS 10. In one embodiment, the CRS 10 provides logic 378 enabling User A to select a data mask from a plurality of data masks, and to apply the selected data mask to a contact record prior to disseminating a response message to User B. Referring to FIG. 13, a data mask may consist of all the attributes of a contact record where the field values are true/false or yes/no to indicate whether a contact reply should include the values. When assembling a contact reply, the data mask is applied as shown in FIG. 13. User A may apply a default "data mask" to a record for added convenience. User A may also select a mask from a plurality of masks when approving a request for a contact record or when offering one of User A's contact records to another user such as User B. In an alternate embodiment, a data mask is used to determine which fields within a contact record may be searched by other users, such that the search index manager 356 only includes fields marked "true" or "yes" in the search index database.

In one scenario, User A is a privacy conscious person who may find approval processes unsuitable (e.g., a celebrity, a politician, etc.), because disseminating the serial number 22 may result in thousands of requests from unknown individuals—creating more labor than User A would find acceptable. In an alternate embodiment, User A may preclude requests for the serial number 22 altogether. Instead, User A may require User B to provide User B's serial number 22 or username to User A, and User A will offer one of User A's contact records to User B electronically by specifying the serial number 22 offered and either User B's username or one of User B's serial numbers 22 in an "offer" type request to the contact registry server 10. User B may accept or decline the contact record offered by User A. User A may exercise the "offer" type request irrespective of whether User A precludes requests for User A's serial number and contact record.

In one scenario, User A wishes to refer User B's serial number and contact record to User C. User A selects User B's contact record and serial number from a list within the contact manager 528 (FIG. 11b) of a contact management application 520 on a network device and invokes a "refer" type request, which requires User A to further specify another user who will receive the referral. User A selects a contact record and serial number for User C. The contact management application via the contact request manager 530 submits the "refer" type request to the CRS 10, which stores the "referral" in a record associated to User C, enabling User C to make a request for User B's contact record via the serial number. In one embodiment, the "refer" type request includes User A's name as the referring party. This notifies User B and User C that User A provided the referral.

In one scenario, User A and User B each have contact information records, which require their respective approvals before disseminating contact information to requesters. User A has previously requested User B's contact information and received approval, and User B has previously requested User A's contact information and received approval. In one embodiment, User A deletes the contact information he/she requested from User B. Referring to FIG. 8c, the CRS 10 is adapted to respond to this contact event by contact event manager 355 looking up requests made by User B for User A's contact information, and presenting User A with the opportunity to rescind approval to User B such that User B will not be able to receive updates to User A's contact record in the future. In another embodiment, User B is notified of User A's rescission of approval for User A's contact record. The CRS 10 is adapted to respond to this contact event by looking up requests made by User A for User B's contact information, and presenting User B with the opportunity to rescind approval to User A such that User A will not be able to receive updates to User B's contact record in the future. Deleting a person's contact record or receiving a rescission of approval for a contact record may indicate the end of a personal relationship such that the CRS 10 should present users with the opportunity to rescind approvals reciprocally.

In one embodiment, the CRS 10 detects a contact event by contact event manager 355 (FIG. 8c) such as a contact record update and spawns additional processes. For example, the CRS 10 may present a user who updates his/her contact record with a list of additional processes the user may invoke, such as updates to tax authorities, postal authorities, or motor vehicle agencies to update tax forms, mailing addresses, or driver's licenses respectively. Other processes may involve enrolling in anti-spam lists, national do-not-call lists, or to provide direct mail marketers or other vendor relationships with updates to the user's contact information. The update contact event manager 355 (FIG. 8c) may present the user with commercial offers such as offers for new business cards or stationery. In another embodiment, the update manager 355 (FIG. 8c) helps to notify organizations of the user's new contact information in accordance with EU Directive on Data Privacy or the Health Insurance Portability and Accountability Act (HIPAA)—ensuring that organizations maintain accurate and up-to-date information on the user. In this embodiment, the update contact event manager 355 (FIG. 8c) may spawn emails or mail notices. Additionally, the CRS 10 may selectively present processes to users depending upon criteria within the contact record (e.g., a Pennsylvania resident changing an address within Pennsylvania would not find a California DMV update process useful). In another embodiment, the CRS 10 may be adapted to invoke the foregoing processes with Third Party Applications (TPAs) using Web 2.0, "mashup" or other integration techniques.

In one embodiment, a contact record may be requested through a hyperlink to a CRS 10 request page, including at least one search parameter. For example, a signature block in an outbound email may include a hyperlink to the CRS 10 request page along with the sender's contact serial number. An email recipient may make a contact record request by clicking the hyperlink.

Referring back to FIG. 2a, after access to User A's contact information is granted to User B, in step 112, the CRS 10 retrieves User A's contact information—identified via the received serial number 22—from the data storage 18. The CRS 10 transmits the contact data (e.g., first name, middle name, last name, telephone number, email address, etc.) in a structured information record, such as an XML file, suitable for mapping to data fields in User B's contact database. The format may be specified by User B's contact management application through a code in the contact request.

Figure 12:
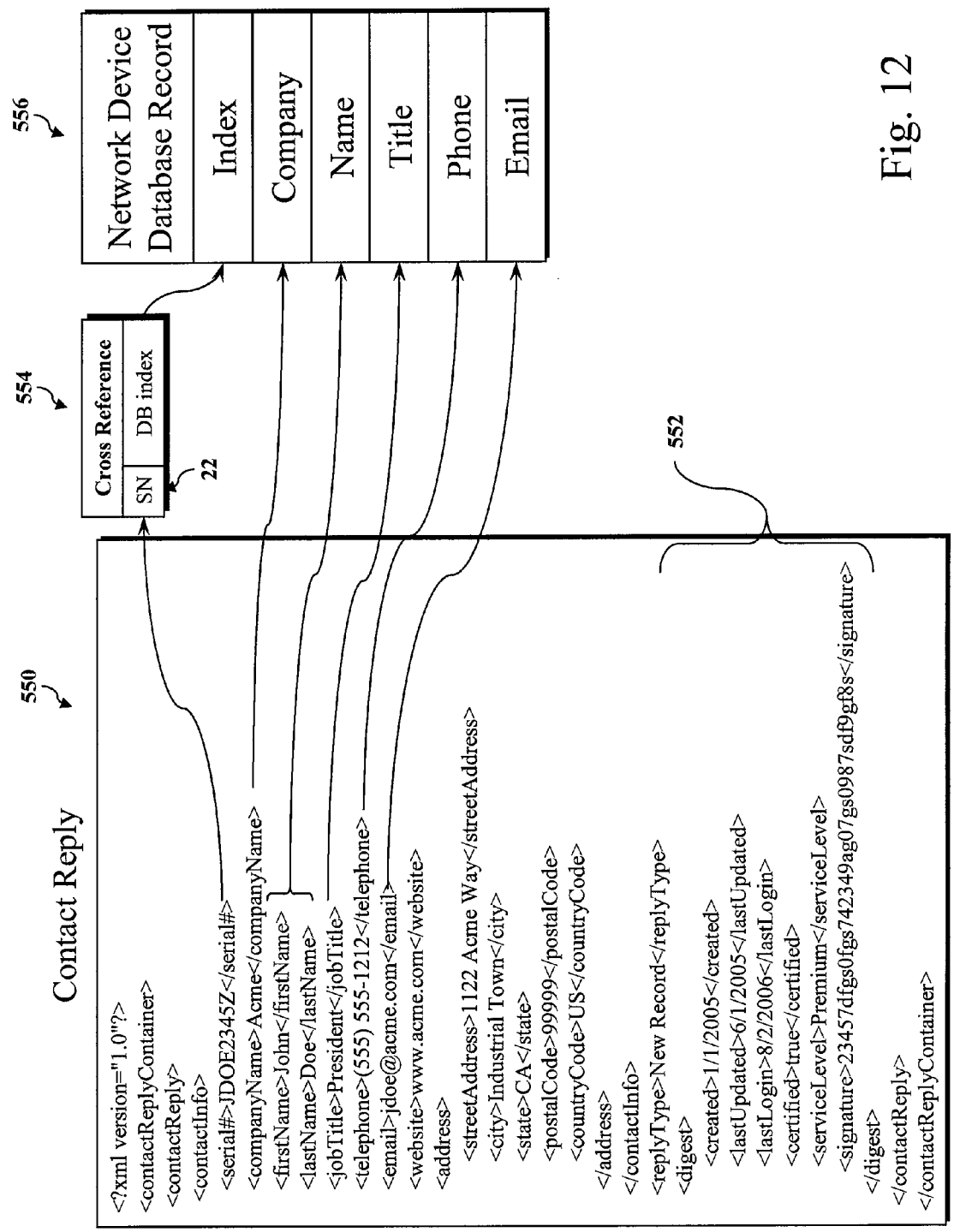
FIG. 12 illustrates an embodiment of a contact reply and an associated network device database record.

Referring to FIG. 12, the response message may contain a "digest" 552 that signs the contact information record using Public Key Infrastructure (PKI) signature technology. This "signature" authenticates the contents of the contact record and may indicate its creation date, last login date and last modified date among other attributes. This digest allows the receiving application to determine that the received contact information record was created and/or modified on the server by the registered user and not another party during transit. The digest may also enable the receiving application to determine whether the user associated to the contact record certified the contents of the information, identify the user's service level, or determine authorized uses of the information (e.g., the EU Directive on Data Privacy, HIPAA, etc.). The digest helps the recipient determine whether the contact record contains reliable information among other uses.

The received contact information is imported into User B's personal contact database in step 114 of FIG. 2a. As illustrated in FIG. 12, the conveyed serial number 22 is stored in a database table 554 that at least includes an identifier of an associated contact record, such as a unique database record index or primary key. An example of a mapping from an XML-formatted contact reply message 550 to a network device database record 556 and cross-reference file 554 is also illustrated in FIG. 12. In one embodiment, the received contact data is entered as a new record and the serial number 22 is stored in a cross-reference file 554 along with the record ID or index of the new record within the contact management application. The cross-reference file 554 facilitates a link between the contact data stored on each network device and the corresponding data stored in the CRS 10, which is useful for updates, synchronization (i.e., the delete requests) and other linked requests.

In one embodiment, User A may wish to provide User B with an alternative contact record and serial number 22 to replace a previously requested contact record and serial number. The contact manager 350 (FIG. 8c) is adapted to enable User A to store a replacement serial number field in a previously requested contact record using the logic to manage the contact 352. The contact request handler 370 is also adapted to enable the request processor 373 to request the alternative contact record in lieu of the original record. The contact request manager 530 and contact cross reference 532 of the contact management application 520 on the network device are modified to process a "replace" response type. In one embodiment, the network device prompts User B to allow one serial number and contact record to replace another serial number and contact record. The contact management application 520 facilitates the replace operation by removing the previous serial number from the cross reference record and replacing it with the alternate serial number, then, it proceeds to update and store the contact record contents.

In one embodiment, the CRS 10 is adapted to facilitate the synchronization of a plurality of personal contact databases associated with a user. The CRS 10 logs each request for contact information from each network device 32 application. When one of the network device applications sends a synchronization request to the CRS 10, the requesting application will automatically receive contact information, deletion instructions, or other information requested by other network-enabled applications associated with that user. In one embodiment, a request results in a contact reply container with multiple contact replies.

In another embodiment, the CRS 10 includes a service providing for the remote deletion of contact information stored on network devices and applications. For example, if a user discontinues the use of an application, or if a network device 32 is lost or stolen, the user may wish to delete the associated contact information on that device and block future contact requests to the CRS 10 from the application or device to prevent misuse of the stored information. In operation, a registered user of the CRS 10 initiates the remote deletion service and identifies the applications and devices targeted for contact information deletion. The CRS 10 logs the identified devices and applications and prevents future contact requests thereby. The deletion of the remote contact information may be implemented through the update and synchronization features described herein (e.g., by identifying the remote records as deleted or updated as blank records) or by adapting the CRS 10 to transmit deletion instructions to one or more of the network-enabled applications that support remote deletion of contact information.

In one embodiment, a serial number is used to identify a role within an organization (e.g., purchasing manager, accounts receivable clerk, etc.) rather than a contact record for a particular individual. A role serial number is assigned by the CRS 10 and mapped to an existing contact serial number in a role database record 414 (see FIG. 9a). A network device 32 requesting contact information associated with a role serial number will receive the contact information of the individual contact record in response. Referring to FIG. 8c, the role manager 390 includes program logic for creating a role 392 and managing a role 394. In one embodiment, the "generate serial number" function 353 is adapted to generate a serial number for the role, and the request processor 373 is adapted to process role requests and replies.

Referring to FIGS. 1 and 4, an embodiment of the operation of role serial numbers will be described. User A establishes a role through an interface on the CRS 10 in step 250. The CRS 10 generates a unique role serial number in step 252 and transmits the role serial number to User A in step 254. In step 256, through a second interface on the CRS 10, User A enters a serial number 22 associated to an individual contact record. The referenced individual contact serial number is mapped to the role serial number managed by User A. In one embodiment, the CRS 10 requests approval to include the individual contact in the role, as required. In step 258, User A conveys the role serial number to a third party, such as User B, to disseminate contact information.

In step 260, User B launches a personal contact management application and enters the role serial number. In step 262, the personal contact management application retrieves individual contact information associated with the entered role serial number from the CRS 10. The CRS 10 receives the role serial number from the personal contact management application and retrieves the corresponding contact record from the database. The individual contact record is transmitted to the personal contact management application, such as through a contact reply. In step 264, the received contact record is stored in the personal contact database. User A may substitute serial numbers as individuals change roles within an organization.

In one embodiment, a plurality of contact serial numbers, such as those belonging to company employees, may be grouped under a single group serial number. A group serial number is assigned by the CRS 10 and mapped to a plurality of existing contact serial numbers or group serial numbers in a group database. Further, a network device requesting contact information associated with a group serial number will receive a plurality of associated contact records in response. Referring to FIG. 8c, the group manager 380 includes program logic for creating a contact group 382 and managing the contact group 384. In one embodiment, the "generate serial number" function 353 is adapted to generate a serial number for the group, and the request processor 373 is adapted to process group requests and replies.

Referring to FIGS. 1 and 3, an embodiment of the operation of group serial numbers will be described. User A establishes a contact group through an interface on the CRS 10 in step 200. The CRS 10 generates a unique group serial number in step 202 and transmits the group serial number to User A in step 204. In step 206, through a second interface on the CRS 10, User A enters one or more serial numbers 22 of potential group members. The group members may be referenced by individual contact serial numbers, role serial numbers and group serial numbers which are mapped to the group serial number managed by User A. In one embodiment, the contact registry server 10 requests approval to include individual contact or group serial numbers in the group, as required. In step 208, User A conveys the group serial number to a third party, such as User B, to disseminate contact information for the group of users.

In step 210, User B launches a personal contact management application and enters the group serial number. In step 212, the personal contact management application retrieves individual contact information associated with the entered group serial number from the CRS 10. The CRS 10 receives the group serial number from the personal contact management application and retrieves the corresponding contact records from the database. The group of individual contact records is transmitted to the personal contact management application, such as through a contact reply container. Through this process, the plurality of contact records (each of which may include more than 100 characters) associated with the group may be retrieved by entering a concise serial number saving a significant amount of time and effort. In step 214, each of the received contact records is stored in the personal contact database. In one embodiment, the personal contact management application maintains a mapping of each contact record to its individual serial number, and each individual serial number to the group serial number.

Another embodiment of the present invention includes a Taskbar Service Module (TSM) such as those available on Windows-enabled computers, which allows the user to activate a taskbar service from a taskbar, search for or make requests for contact information, and approve requests for contact information without the aid of an internet browser. A TSM provides a convenient way to access application functionality available to the CRS 10 or a network device without requiring the user to open a browser, navigate to the CRS 10, provide authentication credentials, and navigate to the particular functionality the user wishes to exercise. A taskbar module also alleviates the need to access other applications, such as email or cellular phone address books adapted for use with the CRS 10. Instead, the user may click on an icon on the taskbar to launch a TSM that will maintain a session with the CRS 10. In one embodiment, the user may enter a serial number 22 and request contact information through the TSM, or approve requests for the user's information as necessary. The TSM stores the username, password, and network address necessary to establish a connection to the CRS 10.

The TSM further includes an Application Programming Interface (API) allowing contact management applications and plug-ins to access the CRS 10 through the established session. The TSM includes functionality to accept requests received through the API from a contact management application, and provides common functions described herein. The use of a TSM simplifies the development of contact management applications and associated application plug-ins and reduces the need to develop redundant functionality when numerous applications are supported for the same operating system.

In one embodiment, an email application may be further adapted to parse incoming email messages using a common protocol such as POP 3 to search for serial numbers 22 attached to or included in an email. If the email application locates a serial number 22, it may determine via a cross-reference file 554 (FIG. 12) if the application already has requested the serial number 22. If the application hasn't requested the serial number 22, the application may present a user interface dialog box offering to make a request, and the user may make the request or close the dialog box without making a request. If a contact serial number is not found in an incoming email, the email application may alternatively issue a search request to the CRS 10 using other identified criteria, such as the sender's email address or contact information identified by parsing the incoming email.

Referring back to FIG. 2b and FIG. 5, in one aspect of the present invention, wireless network devices are adapted to select, send and receive serial numbers using infrared or radio waves. In one embodiment, User A and User B, each with their own wireless network devices, are within proximity of each other. User A selects one of his/her serial numbers for transmission to User B and invokes the transmission process. The wireless network device encodes the serial number such that the receiving wireless device may decode it and identify the serial number as belonging to the service (e.g., incorporated URN syntax, as described herein). User B's network device may present User B with the option of accepting or rejecting the transmission. If User B accepts the transmission, User B's network device receives and decodes the transmitted message. The wireless network device may then request the associated contact record from the CRS 10. In one embodiment, the transmission also includes an approval password or pin so that User B's request does not require further approval from User A.

In another embodiment of the present invention, a network device, such as a public switched telephone network (PSTN) landline telephone using Signaling System Seven (SS7) or similar protocol, is adapted to transmit a request for contact information to the CRS 10 and receive a response containing the requested contact information or other messages using SS7 or a similar protocol. In one embodiment, a telephone network switch that supports SS7 is adapted to receive a request from a PSTN landline telephone and forward the request to the CRS 10. The telephone network switch is also adapted to receive a response from the CRS 10 and forward the response to the PSTN landline telephone that made the request. The CRS 10 is adapted to receive requests and transmit responses using SS7. In an alternate embodiment, the network switch is adapted to convert the SS7 request to a network protocol supported by the contact registry server 10 (e.g., TCP/IP, HTTP).

Figure 16:
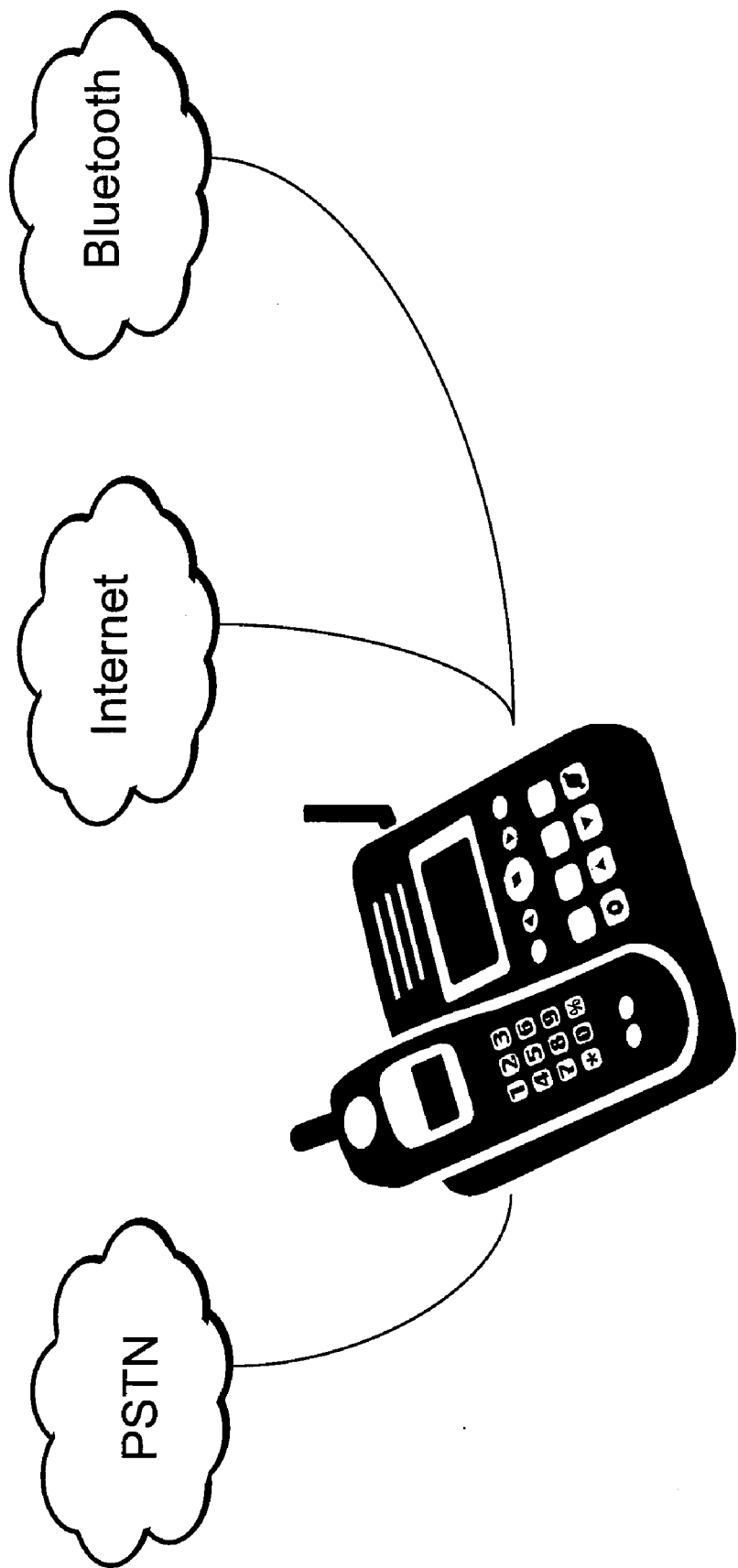
FIG. 16 illustrates an embodiment of a telephone that may be utilized with the contact management system of the present invention.

Referring to FIG. 16, an alternate approach to utilizing a protocol such as SS7 over a PSTN network involves adapting a telephone capable of PSTN (via SS7), Internet (TCP/IP, VoIP, etc), or Wireless (802.11, Bluetooth, etc.) network communication capability to transmit a request for contact information to the CRS 10 and receive a response containing the requested contact information or other messages using the phone's internet communications capability. In one embodiment, implementation leverages the Digital Enhanced Cordless Telecommunication (DECT) protocol for cordless phones. This approach may be more cost-effective and time-efficient compared to making modifications to PSTN networks.

In another embodiment of the present invention, the CRS 10 is adapted to receive and transmit Short Message Service (SMS) communications. A request for a contact record including at least the unique serial number 22 may be transmitted from an SMS-enabled device, such as mobile phone, to the CRS 10. The CRS 10 includes logic to parse the SMS request, retrieve the contact record corresponding to the received serial number, and transmit an SMS message including the requested contact information in reply. The requested contact information may be transmitted as a vCard, unformatted text, or other predetermined format. In this manner, an SMS-enabled mobile device may be used to request and receive contact information from the contact registry server 10 without requiring modification of the software on the mobile device. Searches, search responses, and approval messages may be facilitated in a similar manner. SMS and vCard technologies are supported on most wireless devices worldwide, which would further reduce barriers to adoption of the present embodiment. Other communication protocols supporting the receiving and transmission of text messages over a network may be implemented in a similar manner.

Figure 20:
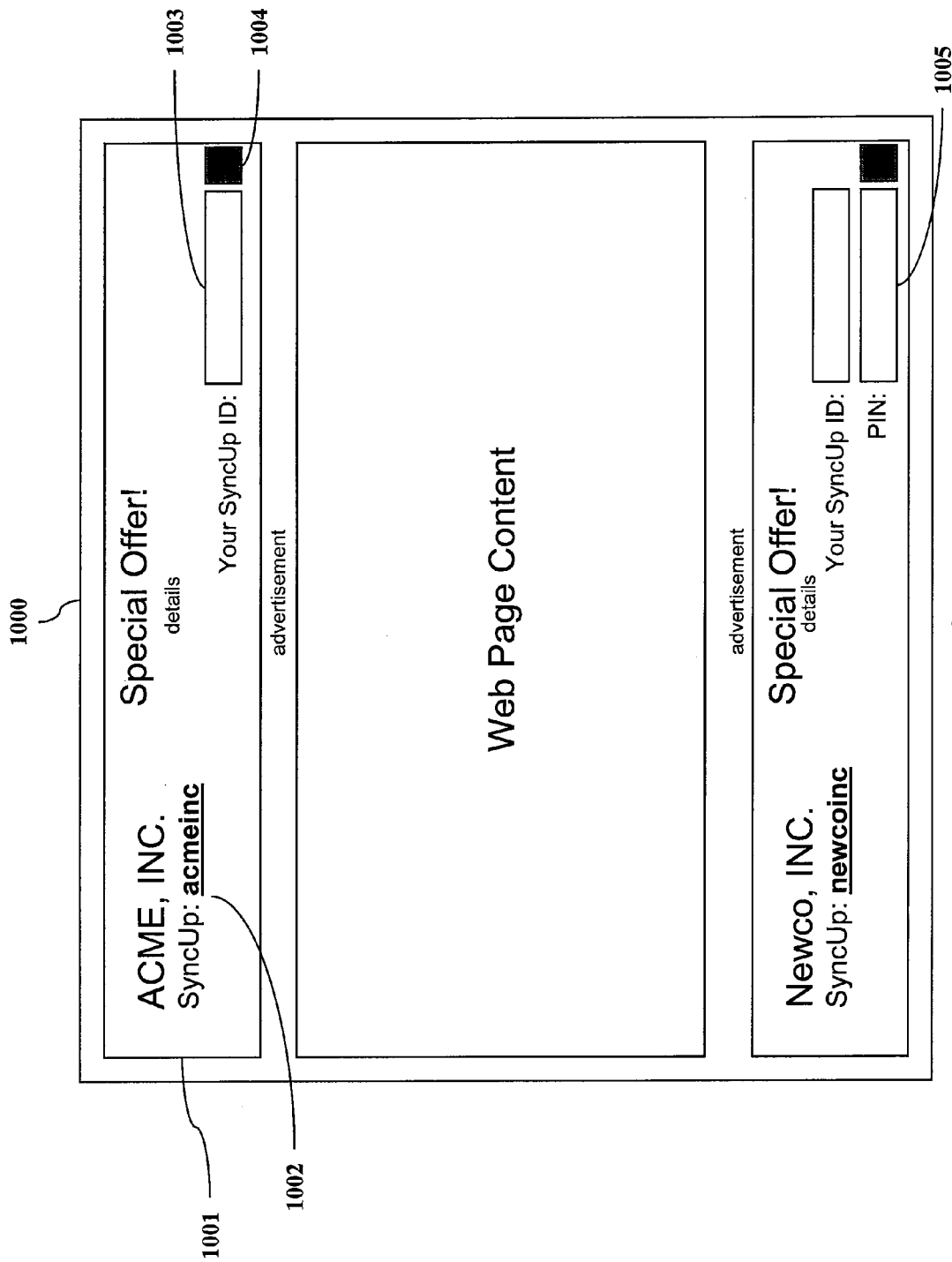
FIG. 20 illustrates an embodiment of a web page with a banner advertisement that incorporates the principles of the present invention.

Referring to FIG. 20, in one embodiment a web page 1000 contains a banner advertisement 1001, which provides the advertiser's serial number 22 as a clickable region 1002 that User A may click to receive the advertiser's contact information. Implementation methods may use a hyperlink, Adobe Flash, image map or other technologies to submit a search request or contact request to the CRS 10, and receive a vCard, search result or contact reply respectively. In another embodiment, clicking on the serial number hyperlink presents a dialog box or web page enabling User A to select from a list of User A's serial numbers and provide other information requested by the advertiser.

In another embodiment, an advertisement 1001 on a web page 1000 or otherwise in a computer display may provide a serial number input field 1003 and a submit button 1004, enabling the person viewing the advertisement to provide a serial number 22 corresponding to their contact information to the advertiser. In this embodiment, the advertising vendor may collect a serial number 22 from a prospective customer and request contact information via the serial number 22 from the CRS 10. The advertisement 1001 may also contain an approval PIN input field 1005 so that the advertiser is automatically approved to receive the submitted serial number 22. Submission of the information to the advertiser may be encrypted. In one embodiment, a request by an advertiser for User A's serial number from the CRS 10 always requires User A's approval.

In another embodiment, the advertiser utilizes a Customer Relationship Management (CRM) system or Sales Force Automation (SFA) system adapted for communication with the CRS 10. The CRM or SFA system is further adapted to receive a serial number 22 submitted by a banner advertisement 1001, and immediately generate a search request or a contact request to receive contact information associated to the submitted serial number 22. The CRS 10 may also be adapted with a particular service level, which requires an advertiser or vendor utilizing a CRM or SFA adapted for communication with the CRS 10 to submit requests with an approval PIN or alternatively to require the approval of the user associated with the serial number before disseminating contact information to prevent vendors, advertisers and others from abusing a user's privacy. Prospective customers may be unwilling to enter complete information due to data entry effort or other concerns, thus, submitting a serial number 22 mitigates data entry effort. An advertiser or other vendor may use contact information received from the CRS 10 for lead generation purposes, or to contact the prospective customer to provide product or service literature, price quotes, special offers or other information. Further, data entry and maintaining accurate and up-to-date information are significant issues for users of CRM or SFA systems. Referring back to FIG. 2e, at step 118, approval criteria may involve a monetary payment by the advertiser. In another embodiment, approval criteria may involve the advertiser providing the prospective customer with another form of consideration, such as a coupon.

In one embodiment, the CRS 10 contains logic for benefits indicators 359 (FIG. 8c) that presents the labor savings associated with the use of the system. An exemplary embodiment finds the sum of characters incorporated into a contact record, and divides the sum by the number of characters in the serial number 22. The CRS 10 or a network device presents the quotient to the user to indicate the estimated labor savings users will realize when requesting the serial number as compared to manual data entry. In one scenario, the CRS 10 computes this quotient for each request to account for benefit variations due to the application of a data mask that selectively restricts the dissemination of certain attributes within a contact record as described herein. In another embodiment, the CRS 10 compares the foregoing quotient with a minimum threshold. If the quotient falls below the threshold, the CRS 10 or a network device provides a message to the user indicating that adding additional data to the contact record will save other users data entry effort.

In another embodiment, the CRS 10 multiplies this quotient by the number of requests for a particular serial number 22, and presents the product to the user to indicate the labor savings multiple requesters have enjoyed collectively. In another embodiment, the CRS 10 periodically sums the foregoing product of all serial numbers in the system to provide the general public with an estimate of the cumulative labor savings delivered by the system. Similarly, the CRS 10 may find the sum of quotients associated to the requests made by a user. The CRS 10 may present the labor savings in a user interface, or may send email reports to the user on a periodic basis. Users who are aware of the savings may use the service more frequently.

In a further embodiment, the CRS 10 logic of the benefits indicators 359 (FIG. 8c) maps each attribute or group of attributes in a contact record to one or more text messages that indicate the benefits users may accrue when receiving the contact information associated to those attributes. The CRS 10 benefits indicators 359 (FIG. 8c) also detects empty contact record attributes, and presents the corresponding text message to the user if an attribute is empty. Users may be inclined to forego data entry if they do not understand the benefits accrued to others (e.g., a record without an address is not useful for Global Positioning System (GPS) or mapping systems).

In one embodiment, use of certain contact management services, such as a request for contact information, is provided to users without charging a fee for the service. Providing services for free may be desirable because it promotes rapid and widespread adoption of the contact management services. The contact registry service provider may collect revenue through the placement of targeted advertisements (including the methods described herein and depicted in FIG. 20) in messages and web pages (e.g., banner ads) transmitted to User B in response to searches for serial numbers, requests for contact records, or other service requests, such as contact record updates. The contact management provider may collect additional revenue by offering premium services on a pay-per-use or subscription basis.

In one embodiment of the present invention, the CRS 10 reserves a sequence of characters in a serial number 22 for the benefit of a user paying a premium, or for the benefit of a particular organization or group. In one embodiment, the beginning character of a serial number up to a terminating character such as a period (.) may indicate a domain. Within this domain, the CRS 10 may reserve one or more character sequences for a particular group. Exemplary embodiments of reserved keywords include company names or stock ticker symbols. In one embodiment, a registered user is only able to generate a serial number 22 with a reserved sequence of keywords if the registered user's account email is confirmed with a particular domain name.

There may be many advantages associated with embodiments of the present invention. For example, in an embodiment, as discussed previously, a contact record is stored in a centralized database 18, and includes a unique, context-free serial number 22. A concise context-free serial number (e.g., not an email address associated with an email account or a telephone number associated with a residence, etc.) is useful for conveyance, contact information requests, creating a request log and a requestee log, and creating a cross-reference 554 (FIG. 12) between the contact record stored in the data storage 18 and a database index of the network device 32's contact management application.

Unlike a context-driven ID such as an email address or telephone number, or an ID that contains a network address or routing information, a user does not typically need to change the context-independent serial number over time, avoiding a break in cross-reference links that would often occur (e.g., when a person changes jobs and thus email addresses and telephone numbers). In this manner, the context-independent serial number is associated with a trademark making it more easily conveyed. Using alphanumeric characters for the serial number makes it possible to issue short, personalized serial numbers amenable to user input that identify an extensive address space. By contrast, a conventional contact record may have over 100 characters, each of which requires entry under a manual input system.

An embodiment also makes it possible retrieve updates and to synchronize many different types of devices and applications quickly, allowing a user to maintain consistent, up-to-date contact information across many different network devices.

In continuing with the description of the contact registry server (CRS) 10 of the present invention, in an embodiment, as shown in FIGS. 8a-8c, the CRS 10 includes a network interface 302 to facilitate communications with network devices 30, 32, a processor 304, and a program memory 306 that includes logic for instructing the processor 304 to facilitate the creation, storage, maintenance and retrieval of contact information in a data storage 18.

The program memory 306 of the exemplary embodiment includes a database server 310 and a web application server 320.

The database server 310 includes a series of data structures 400 (FIG. 9a-9b) which the database server 310 may use for storing data in the data storage 18. The data structures 400 include a User ID table 402 for storing information about registered users, including a User ID and user information. In one embodiment, user information includes an account password and billing information, and may include additional data used by the CRS 10. A second table 404 maps serial numbers to user IDs, allowing the system to track the user associated with each contact record, and allowing a single user to maintain contact information under multiple serial numbers. For example, as discussed previously, a single user may have a plurality of contact records to accommodate multiple languages (e.g., English, French or Japanese), countries and uses (e.g., business and personal). A contact record table 406 stores user contact information and an associated serial number. User contact information may include name, title, address, telephone numbers, email address, company name, web site, and other information. A user-defined field table 410 stores user-defined fields-enabling a user to add fields that are not part of the contact record 406. A group table 408 stores a group serial number and a series of serial numbers associated to individual contact records 406. A role-based serial number table 414 stores a role serial number, a role description and one serial number associated to an individual contact record 406. The SN/UID table 404 may also be used to link the group table or the role-based serial number table to the user ID. A namespace map table 412 stores the namespace, network address, and authentication credentials for the CRS of other service providers offering the same service. An offer table 416 stores contact record offers made by one user to another user. A request log table 418 stores contact requests made by network devices. A requestee log table 420 stores the user IDs of the user who owns a contact record, the user ID of the requesting user, the requested serial number, and the approval status among other attributes. When User A updates a contact record, an internal update table 422 stores update notifications for User B, who previously requested the serial number. An approval record 424 stores the approval status and reply method of requests that require approval. The exemplary embodiment describes the various processes and implementation with various database technologies may lead to various configurations.

The web application server 320 includes a registration manager 330 for handling user registration, an authentication manager 340 for authenticating users and devices accessing the CRS 10, a contact record manager 350 for handling the creation, storage and updating of contact information, a billing manager 361 for charging users, a contact request handler 370 for delivering contact information to requesting network devices, a group manager 380 for handling group creation and management, and a role manager 390 for handling role creation and management.

The registration manager 330 includes processes for creating a new user 332, creating a plurality of new users through a batch process 334, verifying users 335, changing/retrieving a password 336 and deleting users 338. In one embodiment, these processes may be invoked by a user of a network device 30 through a web page interface or via the interface of a contact management application.

In an alternate embodiment, the "new user" batch process 334 invokes the contact record manager 350 to create a plurality of contact records simultaneously. The batch process includes receiving, at the CRS 10, a batch of input data consisting of contact information for a plurality of users. The batch process creates new users and generates batch output data, including the user ID, the temporary password, and the serial number 22, as well as information from the batch of input data (e.g., an email address or a mailing address) that will assist in disseminating registration data to the newly registered users.

The contact record manager 350 generates the serial number 353 for each contact record and creates a new record to link the user ID and the contact record's serial number 404 (FIG. 9a). Invalid batch data can be logged and returned to the requestor in a report. The batch input and output data could come from a file, a database, a network, a directory service (e.g., Lightweight Directory Access Protocol (LDAP) or Active Directory) or other source.

Once a user completes the registration process and changes the assigned temporary password, the contact record may be published, which makes it possible for network devices 32 to request the contact record. Next, the user may set contact permissions 354 for the contact record, which makes it possible for the user to deliberately authorize or refuse each request for the contact record, or to automatically approve or reject requests.

The contact permissions process 354 restricts access of third-party users and network devices to particular contact records. When a contact record is published, the contact information is available for retrieval by any user who enters the corresponding serial number 22. Through the permissions feature 354 and the approval processor 374, a user may manually approve each request for the user's contact information, automatically approve each request, or establish rule-based conditions for approving access to the contact data. For example, the user can deny the provision of contact information to anonymous requestors. Referring back to FIG. 1, when User B requests User A's contact record, the system can generate a response to User A indicating that it is awaiting approval from User A to release the requested information to User B. This would spawn follow-up requests for the record (if approved), a refusal message (if the request is rejected), or a "still waiting" message.

The delete users process 338 includes both single delete and batch delete capabilities. In one embodiment, a large entity such as a mobile telephone provider or Internet Service Provider (ISP) offers access to the CRS 10 as a value-added service bundled with other offerings. The batch delete would be used by large entities when access to the systems changes on a regular basis and may be part of standard integration of the contact registry service to the large entity. In another embodiment, an individual user deletes his or her registration, which is consistent with the EU Directive on Data Privacy or HIPAA that requires that a subject has the right to request the removal of his or her information from a third party server.

In another embodiment, an "existing user" batch process invokes the contact record manager 350 to update a plurality of contact records simultaneously. The batch process includes receiving, at the CRS 10, a batch of input data consisting of contact information for a plurality of users. The batch process provides a user ID, one or more serial numbers and updated information for each serial number. Using the user ID and serial numbers, the batch process selectively retrieves a contact record associated to a serial number, then, updates the contact record with updated data and saves the record. Batch processes for registering users (and deleting registrations), and creating, updating and deleting contact records may reduce the effort associated with updating a plurality of users simultaneously, such as the employees of a large corporation or the users of a third party service such as an Internet Service Provider (ISP) or a wireless network carrier.

The contact record manager 350 includes program logic for creating a new contact 351, managing contacts 352, generating serial numbers 353, and managing contact permissions 354 such as making a contact record available for search and request, and setting request approval criteria. In one embodiment, the logic for generating serial numbers 353 includes a pattern recognition algorithm to filter out serial numbers including offensive or otherwise undesirable sequences of digits. A contact event manager 355 tracks contact record manager activity 350 and may be configured to invoke additional event-driven processes. A search index manager 356 parses a contact record and transforms it into a format suitable for a search engine. A content verification 357 function enables the contact record manager to invoke third party services to verify the content of a contact record (e.g., an address verification system). A signature generator 358 enables the contact record manager to sign digital works using the contents of a digital work, a user's serial number, and a private key such as a password to generate a hash code (e.g., MD5). A benefits indicator function 359 provides alerts and reports to users to indicate the benefits of using a serial number and including additional data in contact information within contact records. The user provides contact information through the contact record manager 350 which stores the contact information in the data storage 18 via the database server 310. Personal contact information may be input and updated through the user interface of a network device 30, including a web page interface.

The contact request handler 370 includes device registration 371 for uniquely identifying each network device 30, 32 that communicates with the CRS 10; a search processor 372 for processing search requests and generating search results (FIG. 6a-6c); a request processor 373 for processing contact request and replies (FIG. 7a-7c), generating request logs 418 and requestee logs 420, and invoking the request processor 373 as needed; an approval processor 374 for managing the approval process of a request, including notifying users, generating approval records 424 (FIG. 9b), and providing replies; a digest generator 375 for signing contact replies; a namespace redirect 376 for looking up different namespaces 412 (FIG. 9a) and rerouting requests for records located within different servers; and a data mask manager 378 for selectively restricting access contact records on an attribute level.

Figure 11B:
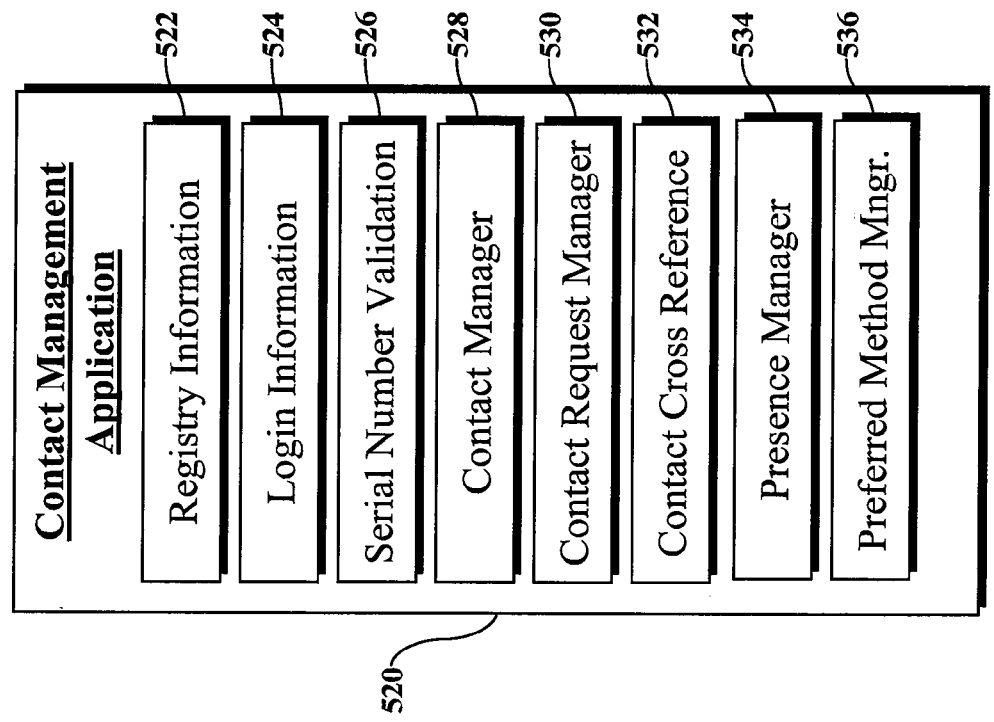
Figure 11A:
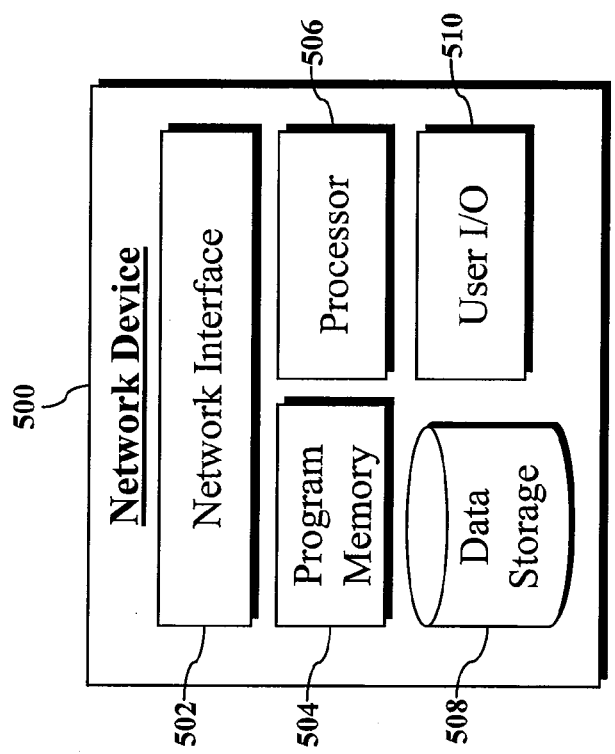
FIG. 11a illustrates an exemplary network device as utilized with the contact registry server of the present invention.

An exemplary network device 500 is further illustrated in FIG. 11a. The network device 500 may be any device adapted to communicate with the CRS 10, such as a personal computer, a personal digital assistant (PDA), a wireless phone, a VoIP phone, a landline phone (e.g., using SS7 protocol), or another type of network-enabled device. The network device 500 includes a network interface 502, providing access to the CRS 10 through the network, a program memory 504 and processor 506 for controlling the network device 500, a data storage 508 and a user input/output mechanism 510, such as a display and keyboard.

Referring to FIGS. 11a and 11b, the program memory 504 includes a contact management application 520 which includes, or is enhanced with, registry information 522 and login information 524, which enable the contact management application 520 to access the CRS 10. A serial number validation function 526 checks the validity of a serial number format entered by a user. In the exemplary embodiment, the serial number validation function 526 verifies that the serial number entered by the user is a 9-digit alphanumeric string and that the error detection code is accurate. A contact manager function 528 provides an interface allowing a user to add, edit, delete and view a plurality of contacts. A contact request manager 530 enables a user to request contact records from the CRS 10. The contact request manager 530 retrieves the network address of the CRS 10 from the registry information 522, generates a request message, and transmits the message to the CRS 10 via the network device's network interface 502, the network 20, and the CRS 10's network interface 302. A contact cross reference function 532 maintains a cross reference table mapping the serial numbers of retrieved contact records to the contacts stored by the network device.

In an alternate embodiment, the program memory 504 includes one or more network-enabled applications. For example, a graphics design application, such as Adobe Illustrator or Adobe InDesign, may include enhancements in the form of a plug-in allowing the application to receive a serial number, contact the CRS 10, and retrieve associated contact information. Through a graphics design application, the user may create a graphic that includes graphic variables. Entering the serial number into the menu for the application plug-in will cause the graphic variables to be set in accordance with the current associated contact information. An employer could use this feature to manage and print business cards, or a printing company might operate as a retail point of sale for the service. When the user updates data, the graphic variables will update automatically.

In another embodiment, the serial numbers of the exemplary embodiment may also be used to aid the completion of online forms. For example, User A may register with a plurality of web sites, with each web site having its own registration screen seeking personal information from User A. Affiliated web sites may include a serial number input field allowing User A to complete the contact information aspects of the form merely by entering his serial number. The web site benefits by ensuring it maintains current customer data, and enticing new users due to the simplified registration process. In some applications, the serial number may be used for user authentication allowing the user to protect his/her email address (and limit spam) and reduce the risk of providing credit card information over the Internet (e.g., ID theft). Further, the contact registry server tracks who has access to the contact registry information, allowing the user to track web sites to which the user is a member and allows the commercial web sites to maintain current contact information for the user.

The serial numbers of the exemplary embodiment may be used anywhere that contact information is requested, including in commercial transactions. For example, User A may contact a customer service call center, or desire to facilitate a commercial transaction such as purchasing merchandise, renting a car, registering for a hotel room, or booking an airline flight. When contact information is requested through a web-based contact request screen, a field for entry of a contact registry serial number simplifies the contact information request process, allowing the remaining contact fields to be populated automatically with corresponding contact information received from the contact registry server. A customer service representative, whether via telephone or in person, may input a serial number from a user into an application adapted for communication with the contact registry server 10 to retrieve all required contact information from the contact registry server in lieu of manual data entry. Organizations benefit through the use of the serial number by reducing the amount of data entry required to acquire demographic information, including reducing the risk of repetitive stress injuries. Organizations also benefit by ensuring accurate data entry, and by receiving periodic updates to the contact information as customer contact information changes.

In another embodiment of the present invention, a commercial application suitable for creating electronic forms, such as Adobe Acrobat, may be adapted for communication with the CRS 10 to retrieve contact information from the CRS and populate the fields of the electronic form. In another example, a serial number may be embedded into a PDF, allowing the PDF to be updated as corresponding contact information changes. This embodiment may be used with employment forms, tax forms, loan applications, health care forms, and other forms that utilize software suitable for creating or editing forms, such as Adobe Acrobat.

Serial numbers may also be used to facilitate mapping, navigation and GPS-related services. In one embodiment, a user seeking directions between two addresses can enter the serial number for the source location and the serial number for the destination location (in contrast to entering two complete addresses) into a compatible internet mapping or navigation system to retrieve the desired directions. Up-to-date contact information can be provided to any Internet-enabled device, ensuring that the two contact addresses are current. Many wireless devices are GPS and Internet enabled allowing users to request real time and location-specific information for the wireless device. For example, a wireless device can determine its current GPS location and identify local services such as the closest movie theater and current movie times. Contact information for such establishments may include an associated contact serial number, allowing the establishment's contact information be easily added to a user's contact address book and the user to receive contact information updates. In one embodiment, an application on the GPS/Internet-enabled device is adapted to display serial numbers along with establishment contact information, and add the serial number to the user's contact management application upon user request. In another embodiment, the contact registry server includes a reverse lookup function that retrieves a current GPS location or address, and returns the identities, contact information and serial numbers of the closest publicly available contacts satisfying user-selected criteria (e.g., restaurants or movie theaters).

The contact registry server and compatible network applications may further include information retention services that are adaptable to an individual's or entity's document retention requirements. When a contact management application requests an update from the contact registry server and the contact registry server provides an updated contact record, the original contact information will be lost unless saved by the requesting application prior to the update. This poses a potential problem to a corporation having a document retention policy that requires such information to be retained for a certain period of time, or to an entity that is involved in public policy or litigation and may be required to preserve electronic information. In one embodiment, a contact request history is maintained by the service module in accordance with user preferences that may include identification of records to store in the history, corresponding data fields that should be stored, and the specification of a "delete after" date (e.g., delete after 5 years).

In another embodiment, the contact information includes substantive content for use by a network-enabled application. For example, a contact record may include a graphic or logo, audio data, or specify a certain font style associated with the contact information that will control the look and feel of material printed through the network-enabled application.

In another embodiment, the contact registry server is provided as an add-on service to the services offered by cellular networks or internet service providers for a nominal fee per subscriber. Revenue may be generated by charging users for information retrieval using such services.

In one embodiment, third party web sites and applications are adapted for use with the present invention using composite application methods popularly known as "Web 2.0" or "mashup." Technologies such as Asynchronous JavaScript and XML (AJAX), JavaScript Object Notation (JSON) and the Document Object Model (DOM) facilitate the incorporation of data and functionality available from the CRS 10 into the web user interfaces of third party applications.

Figure 15A:
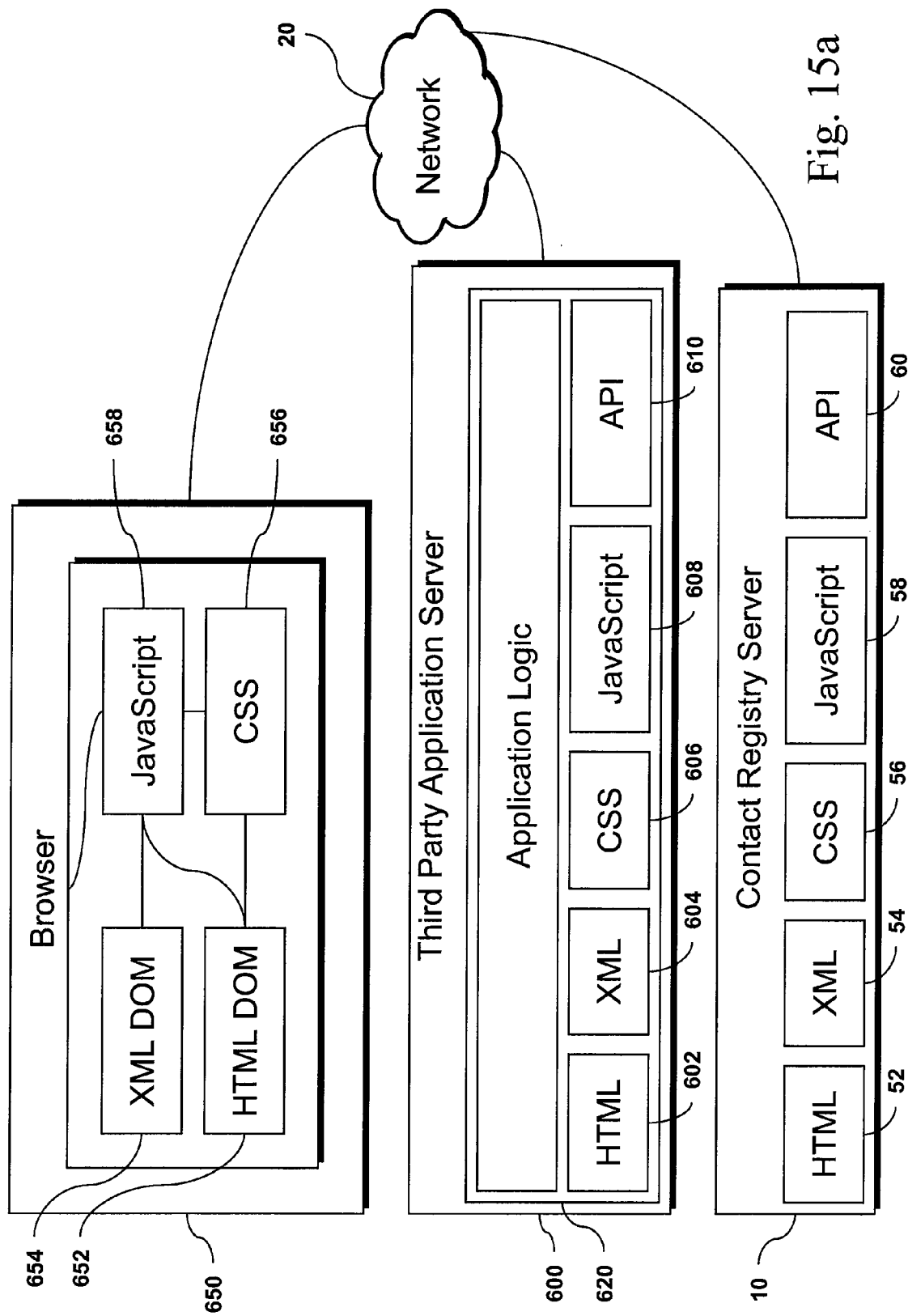

Referring to FIG. 15*a*, a Third Party Application (TPA) 620 resides in a third party application server 600, which serves as the application interface to a client browser 650 and accepts requests (and posts) from the browser 650 via a network 20. The third party server 600 may provide the browser 650 with Hypertext Markup Language (HTML) data 602 to render a user interface, Extensible Markup Language (XML) data 604 to provide application data, Cascading Style Sheet (CSS) data 606 to aid in rendering the HTML and data, and JavaScript data 608 to manipulate and govern the behavior of the user interface (among other uses). The browser 650 may process and render the data accordingly using the Document Object Model (DOM) and a JavaScript interpreter among other technologies.

The TPA 620 also has an Application Programming Interface (API) 610 that enables other applications to interact with the TPA 620. Similarly, the CRS 10 has an API 60 that may process requests from the third party application servers 600, browsers 650, or other network devices 30, 32 (FIG. 1).

In one embodiment, the TPA 620 is able to retrieve HTML data 52, XML data 54, CSS data 56, and JavaScript data 58 from the CRS 10. Using composite application techniques, the TPA 620 is adapted to serve web pages containing HTML (52 and 602), XML (54 and 604), CSS (56 and 606) and JavaScript (58 and 608) such that it is able to present functionality from the TPA 620 and the CRS 10 in a single web page. The TPA 620 is further adapted to receive requests intended for the CRS 10 from the browser 650 via the network 20, then, the TPA may redirect requests to the CRS 10 via the API 60, and finally, receive responses from the CRS 10, which are sent to the browser 650.

Referring to FIGS. 15a-15b, in one embodiment, the TPA 620 is able to serve HTML data 602 containing an XML data map 672, and contact information formatted in XML 674. Using various script programming techniques, a script is able to detect the presence of a data element by its ID within the HTML 602 (e.g., "company"), then, determine if a corresponding target ID exists within the data map 672. If a corresponding target ID exists in the data map 672, the script retrieves a source ID. Finally, the script retrieves a value from contact information 674 and resets the value of the target ID within the HTML data 602. Through these and other methods, the CRS 10 and third party applications are capable of presenting CRS 10 functionality to third party web applications, and providing third party applications with contact information from the CRS 10.

In one embodiment, a web page for a TPA 620 is adapted to accept a username or serial number (in lieu of the username) and password, which is sent to the CRS 10 to authenticate the user of the TPA 620 with the CRS 10. In one embodiment, the CRS 10 responds with an access token, which authenticates the user in subsequent requests to the CRS 10 until the access token expires or the user logs out.

The third party application is further adapted to retrieve User A's personal serial numbers and the corresponding contact information. User A may create, edit or delete his or her serial numbers via the TPA's user interface. In one embodiment, the TPA 620 is adapted to present User A's serial numbers to other users of the TPA.

In one embodiment, a TPA 620 user interface is adapted to accept serial numbers, send requests to the CRS 10 and receive responses from the CRS 10. In an exemplary embodiment, User B enters User A's serial number into the user interface of the TPA 620 and receives a contact record from the CRS 10, which is rendered in the user interface of the TPA 620. In another embodiment, User B enters search criteria and receives a list of serial numbers which match the search criteria in a search result, and User B may further request a specific serial number (a contact request) from among the search results and receive a contact reply.

In another aspect of the present invention, the CRS 10 contains a list of contact records User B requested from other users. A TPA 620 is adapted to retrieve User B's list of contact records from the CRS 10 and present the list of contacts to User B within the user interface of the TPA 620.

In another aspect of the present invention, the CRS 10 contains a list of requests for User A's contact records. A TPA 620 is adapted to retrieve the pending requests for User A's contact records from the CRS 10 and present the list of requests to User A within the user interface of the TPA 620. User A may approve or decline each request for a contact record within the user interface of the TPA 620, and the TPA 620 will update the CRS 10 accordingly.

In another embodiment, User A may offer a serial number (s) to User B via the user interface of the TPA 620, and User B may accept or decline the offer. If User B accepts the offered serial number, the TPA 620 requests the contact record from the CRS 10.

In another aspect of the present invention, a TPA 620 with e-commerce capability is adapted to present CRS functionality that enables User A to register with the CRS 10, create a serial number 22 and contact record, and if necessary to transmit the serial number and contact record back to the TPA 620 for further use. In one embodiment, the TPA 620 provides the CRS 10 with authentication credentials uniquely identifying the TPA 620, and, the CRS 10 contains logic to record User A's activity. The CRS 10 is able to analyze User A's activity for future billing to the owner of the TPA 620. In another embodiment, the TPA 620 is adapted to present the CRS 10's credit card billing fields, and to transmit billing information from the TPA 620 to the CRS 10 securely. These methods enable third party e-commerce applications to sell CRS 10 services to their customers.

Exemplary embodiments of the present invention may include integrating CRS 10 functionality with third party applications such as online email applications, social networks, online web meeting applications, mapping and driving direction sites, shipping sites, retail web sites, or auction sites among others. People utilize or otherwise exchange contact information when using these types of third party applications, and people may benefit substantially from the foregoing exemplary embodiments.

Various implementation techniques may include "toolbar" extensions to web browsers, portlets (e.g., JSR-168) within web pages, or fields and page areas "mashed up" into the user interface of the third party application. Other implementations may use XML derivations such as Simple Object Access Protocol (SOAP) and web services to facilitate interaction with third party applications.

In one embodiment, a web browser is adapted to retrieve each contact record User B requested, and to create a bookmark in User B's web browser using the URL attribute of the contact record. The "request replication" method of synchronization described herein may create useful records other than contact information records in a contact management application.

In an alternate embodiment, an online meeting application (e.g., WebEx) is adapted to authenticate a first meeting attendee with the CRS 10, retrieve the first attendee's serial number(s), and present the serial number to second attendees. These other attendees may select the first attendee's serial number and thereby request the contact information of the first attendee. If the requesting attendee is authenticated with the CRS 10, the request is recorded in the CRS 10 along with the attendee's authentication credentials automatically. If the attendee is not authenticated, the CRS 10 may prompt the attendee to provide a name, email address and note via the third party user interface to facilitate approval and update processes.

In one embodiment, a third party application such as an e-commerce site, an auction site, a mapping site, or a shipping site requires address information such as origination and destination addresses. The TPA 620 is adapted to enable User A to select a contact record from the list of contacts and to populate similar data fields presented in the user interface of the third party application. In one embodiment, the third party application is adapted to use drag-and-drop technology. "Auto-fill" technologies could thereby be augmented to retrieve contact information from the CRS 10 and automatically enter contact information for persons other than User A (e.g., entering a third person's information in a web-based mapping application, or in a mailing address field for the purposes of gift giving, drop ship, driving direction, etc.).

Figure 17:
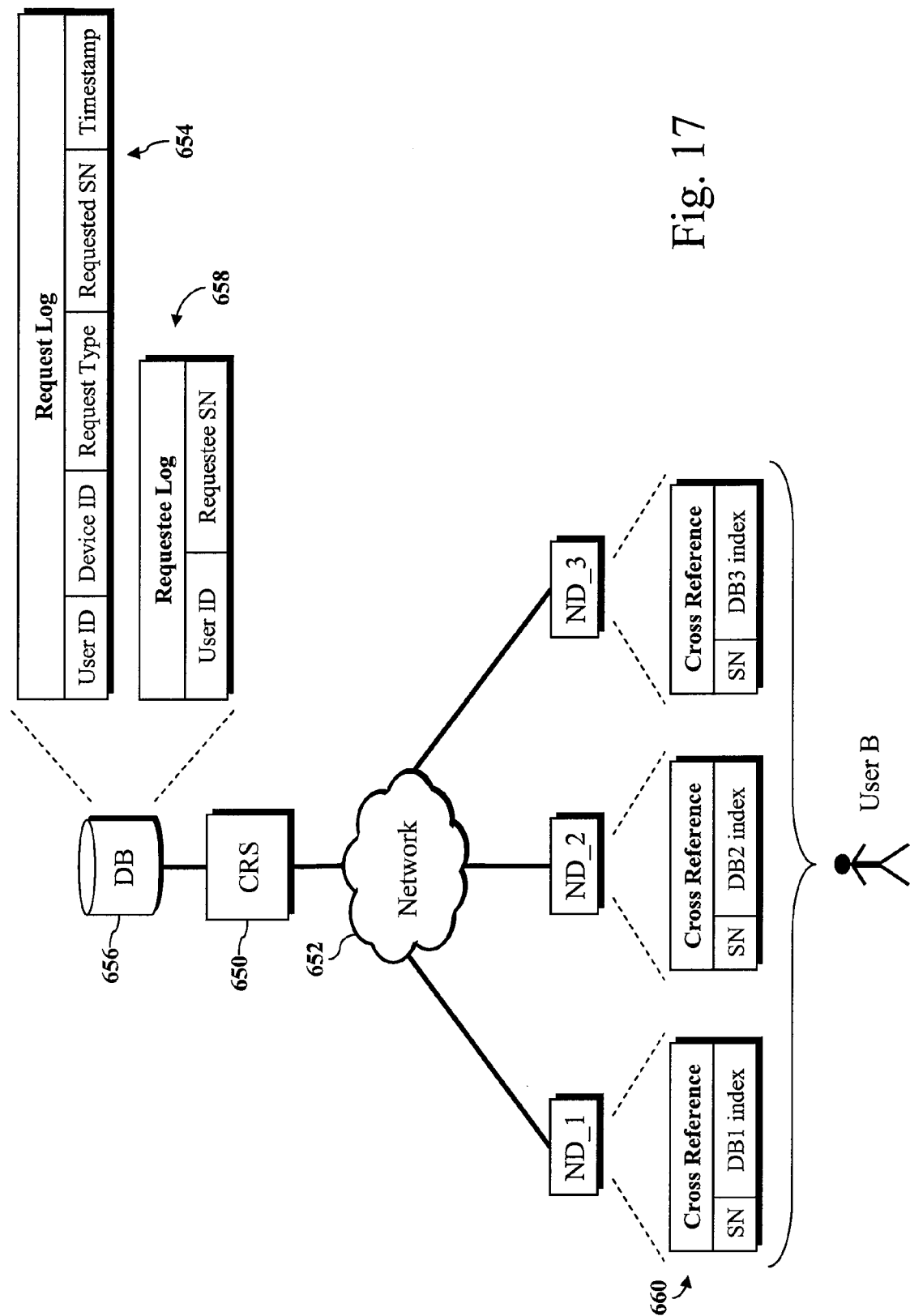
FIG. 17 illustrates an alternative embodiment of the contact management system and method of the present invention as used with multiple network devices of a user.

Referring to FIG. 17, in one embodiment, User B operates a plurality of network devices ND_1, ND_2 and ND_3, such as a personal computer, mobile phone and PDA device. In operation, User B enters a serial number in a first network device ND_1, which transmits a contact request message to a contact registry server (CRS) 650 through a network 652. The CRS 650 returns a contact reply to ND_1 including the requested contact information. The CRS 650 also creates an entry in a request log 654 in the database (DB) 656, logging the time the contact request from ND_1 was processed. ND_1 receives the requested contact information from the CRS 650 and stores the received contact information locally in a memory or other data storage associated with the ND_1.

The request log 654 tracks contact information requests and may include a user ID, a device ID, a request type, the requested serial number, and a timestamp for the request. The user ID uniquely identifies the requesting user and may include one of the user's personal serial numbers assigned by the CRS 650, a login name or other identifier. The device ID uniquely identifies the requesting network device, and in one embodiment a unique identifier is provided in each copy of the network device software before it is deployed on a network device. The CRS 650 may associate a request log with one of the requesting user's categories when the request log includes the serial number for the requesting user's contact. In this manner, a user with more than one serial number, for example, a work serial number and a personal serial number, may manage the synchronization of separate contact lists. In an alternate embodiment, the request may contain a category attribute that enables the user to synchronize only a subset of the contacts requested by various devices (e.g., only synchronize contacts in the "work" category). In another embodiment, the request may contain a list of network device identifiers to synchronize only a subset of the contacts requested by various devices (e.g., only certain devices should synchronize the requested contact). In another approach, the network device software requests a unique identifier from the CRS 650. Alternatively, the MAC address associated with the network device hardware may be used. Identifying each device facilitates the synchronization of contact records across multiple devices. For example, if a person requests a contact record with one device, another network device can request the same record without additional user effort.

The request type includes a code identifying whether the received request is for new contact information, an update to existing contact information, a request to delete contact information associated with User B or other type of request. When User B requests User A's serial number, the contact information is received and may be inserted as a new record into User B's contact management database. User B may later re-request User A's serial number, in which case the contact information is received, the corresponding contact record is located, and the stored contact information is updated with any changes. User B may also issue a request to delete User A's contact information, which causes the contact information record to be deleted from the contact management database. Each of these requests corresponds to database functions that may be implemented in this manner.

Initially, the requested contact information (stored on ND_1) is not stored on network devices ND_2 and ND_3. User B may separately enter the serial number into the contact management applications of ND_2 and ND_3 to retrieve the contact information from the CRS 650. In one embodiment, the network devices ND_1, ND_2 and ND_3 include a synchronization process that is automatically invoked when the respective network device contacts the CRS 650 with a contact request. The network devices may also be configured to periodically (e.g., daily, weekly, monthly, etc.) invoke the synchronization process to regularly check for updates. Further, it is contemplated that a user may manually invoke the synchronization process through the contact management application when desired.

The request log 654 enables User B to initiate a synchronization request to the contact registry server 650 from a network device to download new contact information, remove deleted contact information, and update modified contact information. In this manner, User B is not required to reenter contact serial numbers into each device. In one embodiment, the log's timestamp is used to limit synchronization to records that have been added, updated, or deleted since the device's last synchronization request. The network device may be identified through a device ID and the request log stores the timestamp of the last synchronization for each device ID.

Figure 19:
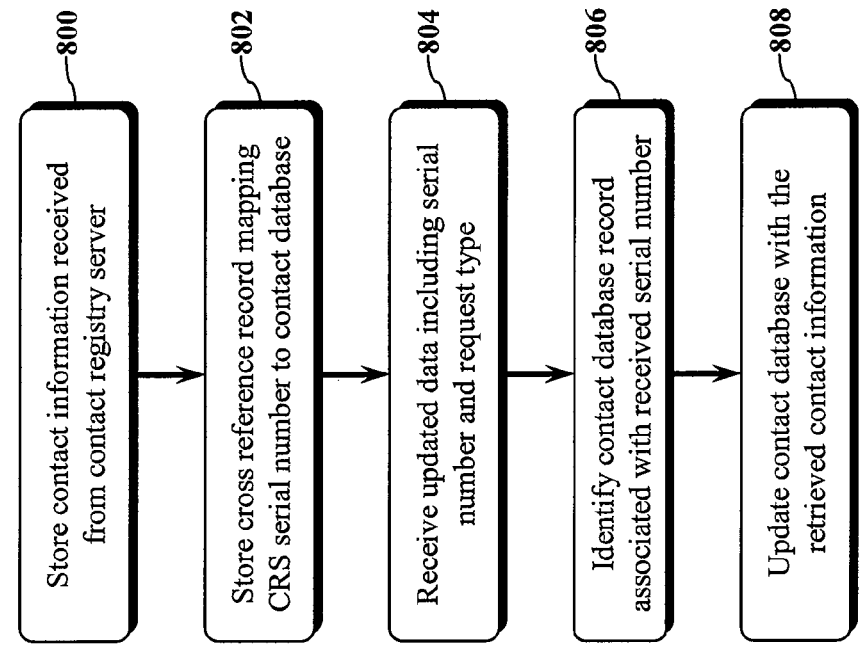
FIGS. 18 and 19 illustrate a synchronization process of the present invention.
Figure 18:
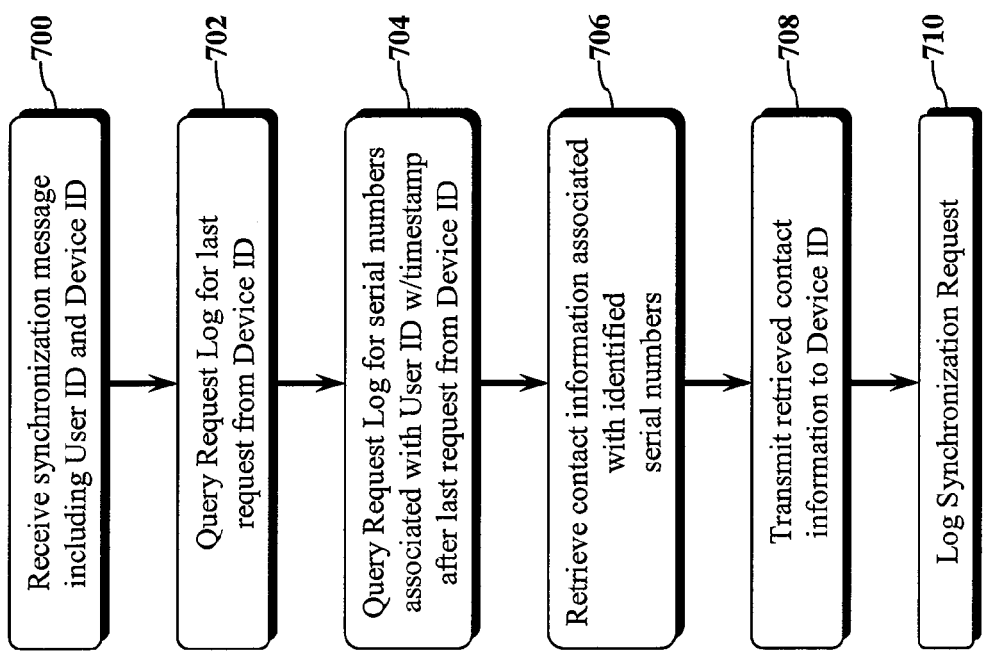

Referring to FIGS. 18 & 19, the synchronization process will be described. When the synchronization process is invoked, a synchronization request message, including the user ID and device ID, is transmitted from the ND_2 to the CRS 650. In one embodiment, the request message may include a serial number associated to a contact of the requesting user or a category. The CRS 650 receives the request in step 700 and queries the Request Log 654 to find the last time that ND_2 contacted the CRS 650 in step 702. In step 704, the CRS 650 retrieves all the request types and serial numbers from the request log entries associated with requests by User B subsequent to ND_2's last communication with the CRS 650, which may be measured by a timestamp field in each entry or some other serial field. In step 706, the CRS 650 retrieves the contact information for each serial number (not needed for request type "delete") and generates contact reply messages to transmit the contact information to ND_2 in step 708. In this case, since User B entered User A's serial number in ND_1, there is a request log entry for User A's serial number. When ND_2 transmits a synchronization request, it receives User A's serial number and contact information from the CSR 650 in the reply. Finally, in step 710, the synchronization request from ND_2 is added to the Request Log 654, along with a current timestamp.

The network device ND_2 updates the contact information stored on ND_2 in accordance with the received request type. In the exemplary embodiment, a serial number/database record cross-reference table facilitates the update of contact records. An embodiment of an update process with a cross-reference table will now be described with reference to FIG. 19. When User B enters a serial number into the contact management application of a network device, a request is transmitted to the CRS 650, which returns associated contact information. A new contact record is created in the local contact information database and the received contact information is stored (step 800). When a new contact record is created, the contact management application assigns a local record identifier (or database index), which is stored as part of the record. In step 802, an entry in a cross-reference database 660 (FIG. 17) is added, mapping the local record identifier to the serial number associated with the contact information.

The cross reference table allows the contact management application to update contact records with information stored at the CRS 650. For example, a single contact record stored on ND_1 can be updated by querying the cross-reference table for the associated local record identifier, identifying the associated contact serial number, and specifying the contact serial number in an update request transmitted to the CRS 650. In step 804, contact information is received from the CRS 650, and the contact serial number is used to retrieve the local record identifier from the cross-reference table in step 806. Next, in step 808, the contact record associated with that local record identifier is retrieved from the contact management application. The contact record stored on the network device may then be updated with new information (or deleted as required).

The contact records are updated according to the received "request type" associated with the contact information. Request types include "new record," "update" and "delete" (among other possible request types). When a network device ND_3 synchronizes its contact information with the CRS 650, a "delete" request from ND_1 will be invoked, and during synchronization the contact reply to ND_3 will have a "reply type" of "delete" and the associated serial number. The contact record associated with the received serial number is then deleted from the contact information database and the cross-reference database.

In one embodiment, when records are added and then subsequently deleted before synchronization can take place, program logic at the contact registry server does not include the records in the replies to avoid unnecessary work by the network device. In another embodiment, the contact registry server further includes an approval log so that synchronization requests do not require User B to approve subsequent requests for every single network device that User A uses. For example, if User A has the serial number of User B, User B may have the option to disallow subsequent requests or updates from User A by removing User A from the Requestee log until User B approves the request subsequently.

As discussed previously, an exemplary contact reply data structure is illustrated in FIGS. 7b and 7c. A contact reply message includes a reply type, serial number and contact information fields. A plurality of updates may occur between sessions and the reply message may have more than one contact reply. To accommodate multiple contacts in a reply message, a contact reply container includes at least one contact reply message and facilitates the transmission of reply messages as a batch. A single contact reply container may include reply messages having different types, such as a contact record or a message to the user (e.g., "awaiting approval").

In one embodiment, when sending a reply message to the network device, the message is encrypted in a common encryption protocol such as MD-5, using the user's User ID as a public key and password as a private key. Using encryption for messaging and storage makes it more difficult for unauthorized users of the contact registry server to gain access to information by eavesdropping, "sniffing" or "spoofing" packet-switched network connections.

Further with respect to encryption, the data that is associated with a contact record that is transmitted to a network device in response to a request by the network device can also be encrypted. In this manner, the data can be used by the network device of the recipient for contacting the person associated with the contact record, however, the actual contact data itself cannot be learned by the recipient because it is encrypted. This can provide utility because it allows the subject of the contact record to provide the contact information to a recipient and allows the recipient to use the contact information, but yet, it protects the privacy of the data for the subject person of the contact record because the data is encrypted, and thus, cannot be known, and perhaps be further transferred, by the recipient themself. In this embodiment, a plug-in may be utilized with the recipient's network device such that the plug-in is able to contact the subject with the device by decrypting the encrypted data.

Referring back to FIG. 17, in one embodiment a requestee log 658 is used to track and control access to user records. When User B requests User A's contact information, for example, a new record is added to the requestee log 658 that indicates that User B has User A's contact information. As illustrated, the "user's ID" is the serial number for User A and serves as a primary key in the database, and the "requestee serial number" is the serial number for User B. When User A makes a change to his or her contact record, the contact manager sends an internal update to each user linked to User A through the requestee log. The internal updates may be maintained in a database table 422 such as that illustrated in FIG. 9b. Where an internal update table is used, records are retrieved as part of the user's synchronization and converted to an entry in the request log to be downloaded the next time User B accesses the CRS 650.

In another embodiment, a new device (e.g., ND_4) registers with the CRS 650. Since it is a new device, there are no previous requests, thus, the synchronization process will retrieve all previously requested serial numbers and populate the new device with contact records. In an alternate embodiment, by specifying a new type of request such as "restore," the CRS 650 may be adapted to override the timestamp of the last synchronization for the device, and thereby retrieve all previously requested serial numbers to update and repopulate the device. Thus, CRS 650 may provide a means of backing up requests such that new devices, or devices that have malfunctioned, may retrieve all contacts.

In one embodiment, the network device is adapted to ensure that the "request replication" method of synchronization does not conflict with traditional methods of synchronization (e.g., the SyncML standard) that may operate concurrently. Prior to initiating a "request replication" synchronization request, the network device searches each contact record in a contact management application that does not have a corresponding entry in the cross-reference record to determine if the record contains a serial number and/or other digest information. If the network device finds a record that contains information generated by the CRS 10 (e.g., a serial number or digest), the network device may infer that the record corresponds to a record in the CRS 10. The network device may then create an entry in the cross-reference record to prevent the synchronization process from creating a duplicate record.

In one embodiment, contact management application 520 (FIG. 11b) on a network device is adapted to detect when User B accesses a contact record that has a corresponding entry in the cross-reference 554 (FIG. 12). The cross-reference is further adapted to store an attribute indicating the last time and date when User B accessed the contact record, and the total number of times User B accessed the contact record. Each time User B accesses a contact record with a corresponding entry in the cross-reference, the contact management application 520 resets the last accessed time and date and increments the total number of times accessed in the cross-reference 554. The contact management application 520 is further adapted to forward these attributes for each contact record in the cross-reference to the CRS 10 periodically. The CRS 10 is adapted to enter the most recently accessed contact record at the top of a list of recently accessed records for the network device and to summarize the number of times User B accessed a particular contact record on a network device. The CRS 10 is further adapted to merge each list for all devices associated to User B. The CRS may be further adapted to store these ordinal rankings in request logs, or to automatically categorize requested contacts according to an ordinal classification such as "Most recently accessed" and "Top 10 Contacts." The CRS and network devices may present or organize records and execute functionality according to the most recent accessed record or how frequently User B accesses particular contact records. For example, User B may have hundreds of records and may access one record via an email address book, which makes the accessed record appear in a "most recently accessed" list in a cellular phone, GPS system, etc. Additionally, the ordinal classification may occur irrespective of the type of device or contact management application used to access the record (e.g., cell phone, email, IM, etc.).

In another embodiment, User B may utilize remote deletion functionality in conjunction with ordinal rankings to remove all contacts in the contact management application of a network device, and then use synchronization functionality to populate the same contact management application with a subset of contacts available to User B at the CRS 10 using category attributes. In one embodiment, User B only wants "Top 10 Contacts" on a network device. In another embodiment, User B only wants location-based contacts on a network device. This may be desirable since network devices may have limited capacity and performance, and contact records may have limited utility. For example, a person on a business trip may wish to have a contact management database containing only "Top 10 Contacts," "Most Recently Accessed" and location-based contacts from the locale of the business trip for more rapid retrieval of relevant contact information.

In one embodiment of the present invention, User A creates a serial number 22 via the CRS 10 and inputs his or her contact information into the corresponding record 406 (FIG. 9*a*). The CRS 10 is further adapted to enable User A to specify preferred methods 360 (FIG. 8*c*) of contacting User A. The CRS 10 stores this information in the contact record and User A may update it on a regular basis. Preferred methods may include an ordinal list of preferences (e.g., email first, IM second, cellular phone third, etc.), rule-based preferences (e.g., do not call after 7:00 p.m.), or other methods such as presence detection (e.g., User A is logged into an Instant Message (IM) system, User A's GPS system provides coordinates to the CRS 10 indicating physical presence at User A's office, etc.).

A request by User B's network device for User A's serial number and contact record results in the dissemination User A's contact information to User B's network device along with the preferred methods of contacting User A. The network device is adapted with a preferred method manager 536 (FIG. 11*b*). When User B views User A's contact record, User B's network device may present the preferred method for contacting User A.

In one aspect of the present invention, User A's network devices are adapted to update User A's contact record 406 in the CRS 10 by providing information regarding User A's availability (e.g., User A's GPS system indicates physical presence near User A's home or office, User A's cell phone is on, User A is logged in to an IM system, etc.). The network device contains logic as a presence manager 534 (FIG. 11*b*) to determine User A's availability and notify the CRS 10. The CRS 10 contains logic as presence detector 379 (FIG. 8*c*) to receive information from the network device and update User A's contact record. User B's network devices may receive updates from the CRS 10.

In one embodiment, when User B attempts to contact User A by a text-based method (e.g., email, SMS, or IM), the network device retrieves the preferred method, and the address or network identifier for the preferred contact method from the contact record. User B may then send the text message to User A via that method.

In another embodiment, when User B attempts to contact User A by voice-based methods (e.g., telephone, wireless phone, or VOIP) the network device attempts to connect via preferred methods in an ordinal manner (e.g., via VOIP first, via PSTN second, via cellular phone third—where the ordinal preference reflects the increasing cost of each method).

In one embodiment, User B attempts to contact User A via a text-based message, and User A's preferred method for receiving a message is voice-based. The text message is converted to speech via text-to-speech technology, and left as a voice mail message for User A.

In one embodiment, User B attempts to contact User A by voice-based methods, and user A prefers to receive text messages. User B may create a voice message that is converted to an audio file and sent to User A via a preferred text method that is also capable of processing a voice file (e.g., email or IM).

If User A specifies that a user such as User B may view User A's contact information, the network device may decrypt and present User A's contact information to User B. Alternatively, User A may completely preclude User B from identifying User A's actual contact information. The network device may store the requested record, which User B's network device may access later, provided the stored copy of User A's contact record has not exceeded its expiration date/time. If User A's contact record has exceeded its expiration date/time, User B's network device may request an update from the CRS 10.

In another aspect of the present invention, User A may further specify an expiration time/date for the record received by the network device. In this embodiment, User B's network device is adapted to receive contact information from the CRS 10 and to initiate communications with User A via that information. The network device may not present User A's contact information to User B, so User B may not have actual knowledge of User A's contact information. In this manner, some users will prefer to withhold their actual information from recipients of their contact information record.

In an embodiment, the CRS 10 enables User A to create a proxy email address and include it in his or her contact record along with User A's actual email address. The CRS 10 is further adapted to configure an email server to receive email messages at the proxy email address and forward received email messages to User A's actual email address. Thus, User A may keep his/her contact information completely private (indirectly available to User B), and simultaneously provide User B with the most convenient method of contacting User A by the mere conveyance of User A's serial number to User B, and User B's request for User A's serial number.

An embodiment of the present invention involves disseminating Public Key Infrastructure (PKI) keys (e.g., X.509). PKI involves generating two keys: a public key for encrypting communications; and, a private key for decrypting communications. A person may also use a private key to digitally "sign" a communication, and the public key may be used to authenticate the "digital signature." PKI technology is widely available for personal use, and is widely used by websites for Secure Socket Layer (SSL) encryption. Public keys are lengthy and cryptic; therefore, they are not amenable to verbal, handwritten or printed conveyance, nor suitable for manual data entry. Conveying public keys via insecure email or network connections or making them freely accessible on a public server enables an unintended recipient to encrypt communications via the public key, or to authenticate communications signed with the private key via the public key. To enhance security, people who use PKI technology in their personal communications often change their public/private key pairs frequently.

Using the process described herein to convey public keys in the same manner as other contact information may provide at least the following benefits: a contact record may be searched and requested; a serial number 22 is easier to convey and enter when compared to a public key; a user may approve or reject a request for a contact record—thereby providing a level of access control to a public key; the process of transmitting the contact record (including the public key) may itself be encrypted—further preventing access to the public key by unauthorized persons; an update process enables a requester to receive updates to public keys when the user who controls the contact record changes the private/public key pair; and through request-replication, multiple network devices associated to the same user may receive access to the public key efficiently.

In one embodiment, the process of creating a record in step 104 includes a field for storing a public encryption key (e.g., using X.509 cryptography) in the contact record. User A may convey the associated serial number 22 to User B in lieu of a public key, and User B will receive the public key when User B requests and receives the contact record corresponding to the serial number 22. As described herein, the request by User B may require User A's approval prior to disseminating the contact record, and by extension the public key also. In an alternate embodiment, the CRS 10 is adapted to generate a public key and a private key such that the public key is stored in a contact record, and the private key is conveyed to the user via an encrypted network connection (e.g., SSL).

In another embodiment, a network device 30 is adapted to detect the presence of a public key in a contact record stored on the network device. User B requests and receives User A's contact record, which contains a public key. In one embodiment, the network connection is encrypted—ensuring that the public key is transmitted securely. In another embodiment, when User B initiates electronic communication with User A, the network device 30 detects that the communication is intended for User A; that the network device 30 has a contact record for User A; and that the contact record contains a public key. The network device 30 may present User B with the option to encrypt User B's communication using User A's public key, or to digitally sign the communication using User B's private key. In one embodiment, when the network device detects a public key within the contact record, it initiates an "update" request to the CRS 10 to ensure that the public key is the most current version before encrypting the communication.

In another embodiment, User A invokes the process of generating a public/private key pair on the CRS 10 from a network device 30, such that the private key is retrieved by the network device and stored securely. When User A receives a communication encrypted by User A's corresponding public key, the network device can retrieve the private key and decrypt the communication on behalf of User A. In one embodiment, the process of storing the private key involves storing the serial number 22 of the corresponding public key with the private key, and further encrypting the private key with a pass phrase; and requiring User A to provide the pass phrase in order to retrieve the private key. In an alternate embodiment, the network device is adapted to import the private key, pass phrase, and any other required data into an application or network device 30 that already supports PKI technology.

In another embodiment, a communication encrypted with a public key or "signed" with a private key may be transmitted along with the serial number 22 (e.g., via email or a network connection). When a network device receives a communication signed with a private key, it may retrieve the corresponding public key from the contact record associated to the serial number 22. When a network device receives a communication encrypted with a public key, the network device may retrieve the corresponding private key or alternatively prompt the user for a pass phrase prior to retrieving the corresponding private key—thereby streamlining communications using PKI technology.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing user information comprising:
   receiving, at an information management system, user information from a first network device;
   creating, in the information management system, a first user account, the first user account storing first user authentication criteria;
   creating, in the information management system, a first user information record associated to the first user account, wherein a first segment of the user information record is at least one of searched and requested without access controls, and wherein a second segment of the user information record is at least one of searched and requested subject to at least one access control, where one type of access control includes an approval criterion;
   storing, in the first user information record, the received user information wherein a first subset of the received user information is stored in the first segment of the user information record, and wherein a second subset of the received user information is stored in the second segment of the user information record;
   generating a unique serial number for the first user information record, the unique serial number not used exclusively to reference the location of a single data element;
   storing the serial number in the first user information record;
   conveying the serial number to a recipient;
   receiving, at the information management system, a request for user information from an application;
   processing the request for user information; and,
   transmitting a reply to the application in response to the request for user information.

2. The method of claim 1, wherein creating a first user account includes verifying at least a subset of the received user information by a person or entity other than the person or entity associated with the received user information.

3. The method of claim 1, wherein creating a first user information record includes receiving and storing keywords in the first information record.

4. The method of claim 1, wherein creating a first user information record includes creating a publicly available user information profile and storing it in the first segment of the user information record.

5. The method of claim 1, wherein creating the first user information record includes generating and presenting a message indicating a measure of the data entry labor savings enjoyed by a user requesting user information via the serial number where an increase in the measure of data entry labor savings is proportional to an increase in the amount of user information.

6. The method of claim 1, wherein creating the first user information record includes specifying a preferred method of using the user information.

7. The method of claim 1, wherein creating the first user information record includes creating and storing at least one data field.

8. The method of claim 1, wherein creating the first user information record includes indexing at least a portion of the data of the first user information record and storing the indexed data within the data storage of a search engine.

9. The method of claim 8, further comprising receiving a request at the search engine from a third party search engine and providing a response from the search engine to the third party search engine.

10. The method of claim 1, wherein creating the user information record in the information management system includes generating a public encryption key and a provide encryption key pair.

11. The method of claim 1, wherein creating the user information record in the information management system includes storing a public encryption key in the user information record.

12. The method of claim 1, wherein creating the first user information record includes setting an access control, the access control authenticating a request as a request from a user associated to a user account in the information management system using user authentication criteria.

13. The method of claim 12, wherein setting an access control further includes setting an approval criterion, the approval criterion includes exchanging an item of value as consideration for approval.

14. The method of claim 12, wherein setting an access control further includes setting an approval criterion, approval criterion setting at least one of a personal identification number (PIN) and a password.

15. The method of claim 12, wherein setting an access control further includes setting an approval criterion, wherein the approval criterion includes a means of creating and storing an approval criterion in the first user information record and further including a corresponding approval criterion in a communication, transmitting the communication to a recipient, receiving a request initiated by the recipient of the communication, the request including the corresponding approval criterion, and the information management system verifying the corresponding approval criterion with the approval criterion stored in the first user information record.

16. The method of claim 12, wherein setting an access control further includes setting an approval criterion, the approval criterion includes a means of establishing a binding agreement on a use of the user information associated with the first user information record following approval.

17. The method of claim 1 wherein generating the unique serial number corresponding to the first user information record includes receiving by the information management system a unique serial number candidate and verifying that the serial number candidate is unique.

18. The method of claim 1 wherein generating a unique serial number corresponding to the user information record includes generating a serial number that such that the serial number is optimally suited for data entry on a keyboard wherein a single key may represent a plurality of characters and/or numbers.

19. The method of claim 1, wherein generating a unique serial number corresponding to the user information record includes creating a proxy serial number and referencing the unique serial number by the proxy serial number.

20. The method of claim 1, wherein generating a unique serial number corresponding to the user information record includes reserving by the information management system a preferred sequence of characters and/or numbers.

21. The method of claim 1, wherein conveying the serial number to the recipient includes:
   inputting search criteria into a search input field by the recipient;
   submitting the search criteria as a request to a search engine; and,
   receiving a search result from the search engine in response to submitting the search criteria as a request, wherein the search result includes the serial number.

22. The method of claim 21, wherein receiving the search result includes receiving a publicly available information profile associated with the serial number.

23. The method of claim 1, wherein conveying the serial number to the recipient includes entering or selecting a second serial number, submitting the second serial number in a request to the information management system, and receiving the serial number in a reply from the information management system.

24. The method of claim 1, wherein conveying the serial number to the recipient includes transmitting by a first device to a second device via a using a short range wireless transmission protocol.

25. The method of claim 1, wherein conveying the serial number to the recipient includes correlating the serial number to a second serial number associated with a second user information record.

26. The method of claim 1, wherein conveying the serial number to the recipient includes substituting a second serial number for the serial number.

27. The method of claim 1, wherein conveying the serial number to the recipient includes incorporating the serial number into an electronic banner advertisement.

28. The method of claim 27, wherein incorporating the serial number into an electronic banner advertisement includes creating a hyperlink for making the request for the user information record corresponding to the serial number from the information management system.

29. The method of claim 1, wherein conveying the serial number to the recipient includes:
   incorporating a form in an electronic banner advertisement;
   entering the serial number into the form; and,
   conveying the serial number via the form and the electronic banner advertisement to the recipient.

30. The method of claim 29, wherein conveying the serial number via the form and the electronic banner advertisement generates the request for the user information record corresponding to the serial number from the information management system.

31. The method of claim 30, wherein conveying the serial number via the form to the recipient operates in conjunction with an enterprise application capable of tracking an advertising campaign and generating prospective customer lead.

32. The method of claim 1, wherein the request for the user information record from the information management system requires an approval for a grant of the request and wherein the request includes an offer of a thing of value as consideration for the approval of the request for the user information record.

33. The method of claim 1, wherein the claimed steps are performed through a third party application using a composite application technology.

34. The method of claim 2, wherein a third party application facilitates verifying at least a subset of the received user information.

35. The method of claim 33, wherein the third party application facilitates bill presentment and payment on behalf of the information management system.

36. The method of claim 33, wherein the third party application is an online meeting application.

37. The method of claim 33, wherein the third party application is a web browser and wherein the step of transmitting the data associated with the user information record to the application includes creating a bookmark entry in the web browser.

38. The method of claim 33, wherein the third party application is a web browser and wherein the step of transmitting the data associated with the user information record to the application includes encrypting the data while in transmission.

39. The method of claim 1, wherein transmitting the data associated with the user information record to the application includes applying a data mask to the user information record such that the transmitted data associated with the user information record is a subset of the data associated with the user information record.

40. The method of claim 8, further including applying a data mask to the user information record such that the indexed data is a subset of the data associated with the user information record.

41. The method of claim 1, wherein transmitting the data associated with the user information record to the application includes generating a hash code and verifying the information associated with the data by the hash code.

42. The method of claim 1, wherein generating the unique serial number corresponding to the user information record includes utilizing the serial number as a public key in conjunction with an identity-based encryption algorithm to sign a digital work.

43. The method of claim 1, wherein receiving the request by the application for the user information record from the information management system corresponding to the serial number includes receiving a publicly available information profile of a requester.

44. The method of claim 1, wherein generating the unique serial number corresponding to the user information record includes a namespace identifier.

45. The method of claim 1, wherein receiving the request by the application for the user information record from the information management system corresponding to the serial number includes receiving a namespace identifier for the serial number and directing the request to the information management system corresponding to the namespace.

* * * * *